(12) United States Patent
Larsen

(10) Patent No.: US 6,965,568 B1
(45) Date of Patent: Nov. 15, 2005

(54) MULTI-HOP PACKET RADIO NETWORKS

(75) Inventor: Mark Sievert Larsen, Pretoria (ZA)

(73) Assignee: Salbu Research and Development (Proprietary) Limited ( * ) Notice: Subject to any disclaimer, the term of this patent is extended or adjusted under 35 U.S.C. 154(b) by 0 days.

(21) Appl. No.: 09/570,892

(22) Filed: May 15, 2000

Related U.S. Application Data

(62) Division of application No. 08/849,875, now Pat. No. 6,097,703, filed as application No. PCT/GB95/02972 on Dec. 19, 1995.

(30) Foreign Application Priority Data

Dec. 19, 1994 (ZA) .................................. 94/10066

(51) Int. Cl.[7] .......................... H04L 12/26; H04Q 7/00; H04Q 7/24; H04B 17/00
(52) U.S. Cl. ...................... 370/238; 370/237; 370/252; 370/332; 370/392; 370/436; 370/255; 370/338; 455/513; 455/67.11; 455/69; 455/67.14; 455/452.2
(58) Field of Search ............................... 370/252, 328, 370/310, 310.01, 310.02, 318, 321, 329, 370/332–334, 337–338, 341, 309, 436, 437; 455/67.1, 67.3, 67.4, 69, 62

(56) References Cited

U.S. PATENT DOCUMENTS

| | | | | |
|---|---|---|---|---|
| 4,937,822 A | * | 6/1990 | Weddle et al. | 370/436 |
| 5,117,422 A | * | 5/1992 | Hauptschein et al. | 370/310 |
| 5,146,454 A | * | 9/1992 | Courtois et al. | 370/252 |
| 5,204,855 A | * | 4/1993 | Bebee et al. | 370/436 |
| 5,359,595 A | * | 10/1994 | Weddle et al. | 455/62 |
| 5,450,616 A | * | 9/1995 | Rom | 455/69 |
| 5,481,532 A | * | 1/1996 | Hassan et al. | 370/312 |
| 5,490,287 A | * | 2/1996 | Itoh et al. | 455/67.1 |
| 5,574,984 A | * | 11/1996 | Reed et al. | 455/67.1 |

* cited by examiner

Primary Examiner—Steven Nguyen
(74) Attorney, Agent, or Firm—Ladas & Parry LLP

(57) ABSTRACT

An adaptive communication system utilises opportunistic peak-mode transmissions to transmit data between originating and destination stations, via one or more intermediate stations. Each station monitors the activity of other stations in the network, storing connectivity information for use in subsequent transmissions. Each station also sends out probe signals from time to time, to establish which other stations are in range. Messages are then sent across the network from station to station, with confirmation data being transmitted back to the originating station, until the destination station is reached. Old messages, which would otherwise clog the network, are timed out and deleted. A communication network and transceiver apparatus for use in the network are also disclosed.

31 Claims, 13 Drawing Sheets

FIG. 5

| SYNCHRONISATION SEQUENCE - TO ALLOW MODEM TO LOCK. | MESSAGE TYPE. | ORIGINATION ADDRESS OF CURRENT HOP. | DESTINATION ADDRESS OF CURRENT HOP. | FINAL DESTINATION ADDRESS OF MESSAGE. | ADAPTATION PARAMETERS- POWER, DATA RATE, DURATION, DUTY CYCLE. | ORIGINATION ADDRESS, MESSAGE IDENTIFIER AND MESSAGE DATA | ERROR CORRECTION AND DETECTION CODES. |

FIG. 6

| SYNCHRONISATION SEQUENCE - TO ALLOW MODEM TO LOCK. | MESSAGE TYPE. | ORIGINATION ADDRESS OF CURRENT HOP. | DESTINATION ADDRESS OF CURRENT HOP. | FINAL DESTINATION ADDRESS OF MESSAGE. | ADAPTATION PARAMETERS- POWER, DATA RATE, DURATION, DUTY CYCLE. | CONTROL PARAMETERS- PROBE, REQUEST, ACKNOWLEDGEMENT, MESSAGE ACKNOWLEDGE. | ERROR CORRECTION AND DETECTION CODES. |

MULTI-HOP PACKET RADIO NETWORKS

This application is a division of U.S. Ser. No. 08/849,875 (now U.S. Pat. No. 6,097,703) filed Jun. 18, 1997 and effectively filed Dec. 19, 1995, which is a U.S. National Completion of PCT/GB95/02972 filed Dec. 19, 1995, which applications are hereby incorporated herein by reference.

BACKGROUND OF THE INVENTION

THIS invention relates to a method of transmitting data between originating and destination stations in a multi-station communication network, to a communication network for implementing the method, and to communication apparatus for use in the network.

Communication networks are known which require one or more controlling nodes or base stations through which messages must be routed from originating to destination stations. Such networks are vulnerable to breakdown of the controller nodes or base stations. In addition, the controller nodes or base stations are relatively expensive, and remote stations in the network are restricted in their movement with respect to the base stations.

The connectivity between stations in such a network may change due to relative movement between remote stations and the base station, interference, noise and other factors. In a Rayleigh fading environment, the rate of fluctuation of signal strength, noise and interference changes the connectivity between stations in the network on an instantaneous basis, making any method of fixed routing or adaptive routing by the passing of routing information between stations almost impossible. Generally, in order to compensate for interference and fading, messages are transmitted redundantly and with sufficient power to ensure their reception, leading to sub-optimal utilisation of the network and to interference between stations. Sub-optimal utilisation of the network results in a reduction in the network capacity (Erlangs) for a given area and a given spectrum allocation.

SUMMARY OF THE INVENTION

According to a first aspect of the invention there is provided a method of transmitting message data from a first one of a plurality of stations in a network to a second one of the plurality of stations, the method comprising:

monitoring, at the first station, the activity of other stations in the network;

transmitting the message data to at least one opportunistically selected intermediate station for onward transmission to the second station; and transmitting confirmation data back from the at least one intermediate station to the first station, indicative of the onward transmission of the message data.

Preferably, each station in the network monitors the activity of other stations on an ongoing basis in order to determine the availability of those other stations, according to predetermined criteria, as intermediate or destination stations.

The monitoring may be carried out by receiving data transmitted by the other stations, and analysing the received data transmissions to select an intermediate or destination station.

The monitoring may further include extracting information from the received data indicating at least the identity of the other stations.

For example, the information may relate to the destination and/or the origin of message data transmitted to or received from the other stations.

The method may also include extracting information from the received data relating to the final destination and/or primary origin of the message data.

The method may further include extracting information from the received data relating to the propagation delay of each message, the data rate of each message and/or the volume of messages between any two or more stations.

The data transmitted by each station may include time data, the monitoring including determining the age of data transmissions received from other stations in the network and discarding data transmissions older than a predetermined age.

The time data in the received data transmissions may be compared with a reference time, and the received data transmissions may be discarded a predetermined period after the reference time.

The method preferably includes allocating a priority to received data transmissions, and adjusting the order of retransmission of the received data transmission to other stations according to the age thereof.

The method may include monitoring the quality of the signal path between the first station and one or more of the other stations and adapting, according to predetermined criteria, at least one parameter of a subsequent transmission to another station in accordance with the monitored quality of the signal path to increase the probability of the transmission being received successfully.

Preferably, information is extracted from the received data relating to the quality of the transmission path between any two or more of the other stations.

The method may include deriving from the received data adaptation information for use in adapting, according to at least one predetermined criterion, at least one parameter of a subsequent transmission to another station to increase the probability of the transmission being received successfully.

The adaptation information may be transmitted to one or more other stations in an adaptation signal, the one or more other stations being responsive to the adaptation signal to vary at least one parameter of a subsequent transmission therefrom.

The parameter which is adapted may be one or more of the data rate, transmission power, transmission frequency, transmission or reception antenna, message length, message priority, message time to live, time of transmission, and message retransmission rate.

The monitoring step preferably further includes transmitting a probe signal from the first station to at least one intermediate station, the probe signal containing at least address data identifying the first station (and preferably the second station), and transmitting an acknowledgement signal from the selected intermediate station to the first station.

According to a second aspect of the invention there is provided a communication network comprising a plurality of stations each able to transmit and receive message data, each station comprising:

transmitter means for transmitting data to other stations;

receiver means for receiving data from other stations;

monitoring means for monitoring at least one characteristic of respective channels between a first station and other stations;

decision means for selecting another station as an intermediate station for onward transmission of message data from the first station to a destination station; and control means for adjusting at least one parameter of a transmission signal transmitted by the transmitter means according to the monitored at least one characteristic of the respective channel to increase the probability of the transmission signal being received successfully by the selected intermediate station.

The monitoring means of each station is preferably adapted to analyse data in signals received from other stations to select the intermediate station.

The control means is preferably adapted to monitor the age of data transmissions received from other stations in the network and to discard data transmissions older than a predetermined age.

The control means may be arranged to include time data in each data transmission, to monitor the age of received data transmissions by comparing time data therein with a reference time, and to discard the received data transmissions a predetermined period after the reference time.

Preferably, the control means is arranged to allocate a priority to received data transmissions and to adjust the order of retransmission of the received data transmissions to other stations according to the age thereof.

Each station may include storage means for storing data in the received signals relating to the identity of the other stations, and processor means for determining the quality of the signal path between the receiving station and each of the other stations.

The monitoring means is preferably adapted to generate a probe signal for transmission to other stations, the probe signal containing at least address data identifying the originating station (and preferably the destination station); and to receive an acknowledgement signal from other stations receiving the probe signal.

The control means is preferably adapted to vary the data rate, transmission power, transmission frequency, transmission or reception antenna, message length, message priority, message time to live, time of transmission, message retransmission rate, and/or other parameters of its transmission to the selected intermediate station.

According to a third aspect of the invention there is provided communication apparatus for use as a station in a communication network comprising a plurality of stations each able to transmit and receive message data, the communication apparatus comprising:

transmitter means for transmitting data to other stations;

receiver means for receiving data from other stations;

monitoring means for monitoring at least one characteristic of respective channels between the apparatus, operating as a first station, and other stations;

decision means for selecting another station as an intermediate station for onward transmission of message data from the first station to a destination station; and control means for adjusting at least one parameter of a transmission signal transmitted by the transmitter means according to the monitored at least one characteristic of the respective channel to increase the probability of the transmission signal being received successfully by the selected intermediate station.

The monitoring means is preferably adapted to analyse data in signals received from other stations to select the intermediate station.

The apparatus may include storage means for storing data in the received signals relating to the identity of the other stations, and processor means for determining the quality of the signal path between the receiving station and each of the other stations.

The monitoring means is preferably adapted to generate a probe signal for transmission to other stations, the probe signal containing at least address data identifying the originating station (and preferably the destination station); and to receive an acknowledgement signal from other stations receiving the probe signal.

The monitoring means may be adapted to vary the data rate, transmission power, transmission frequency, transmission or reception antenna, message length, message priority, message time to live, time of transmission, message retransmission rate, and/or other parameters of its transmission to the selected intermediate station.

Preferably, the monitoring means comprises power sensing means and controllable attenuator means responsive to power control signals derived from an output of the power sensing means to attenuate received and/or transmitted signals to within predetermined levels.

The controllable attenuator means may comprise a plurality of resistive elements and a plurality of associated solid state switch elements responsive to the power control signals and arranged to connect the resistive elements to, or disconnect them from, the signal path.

The control means is preferably adapted to adjust the transmission power of the transmission signal in response to the measured power of a received signal.

The control means may include current or power sensing means for monitoring the transmission power of the transmission signal, comparison means for comparing the transmission power with the measured power of a received signal and for generating a transmission power control signal, and controllable driver means in the transmitter means responsive to the transmission power control signal to adjust the transmission power towards a value having a predetermined relationship with the measured power of the received signal.

The monitoring means preferably includes demodulator means operable at a plurality of predetermined data rates, thereby to demodulate received data at any one of the predetermined data rates.

The demodulator means may comprise a plurality of demodulators arranged in parallel and each operating at a respective different predetermined data rate.

Preferably, the demodulator means further comprises selection means for monitoring the outputs of the parallel demodulators and for selecting an output which is delivering validly demodulated data.

The apparatus may include processor means and associated vocoder means for converting speech to data for transmission and for converting received data to speech.

The vocoder means preferably comprises at least two vocoders arranged in parallel and operable at different data rates, the processor means being operable to select data from the vocoders for transmission according to the monitored at least one characteristic of the channel.

The at least two vocoders are preferably operable independently to convert a speech signal to respective different data signals at different data rates or using different vox settings, the processor means being operable to select any one of the different data signals for transmission.

The processor means may be operable to output received data to a selected one or more of the vocoders at a rate selected to convert the received data to speech according to predetermined criteria.

The processor means may also be operable to add or remove data selectively from the received data output to the selected one or more of the vocoders to control the rate at which a speech signal represented by the received data is replayed.

In a preferred embodiment, the at least two vocoders are operable independently, at least one to convert a speech signal to data for transmission, and at least one to simultaneously convert received data to speech.

The control means is preferably adapted to monitor the age of data transmissions received from other stations in the network and to discard data transmissions older than a predetermined age.

The control means may be arranged to include time data in each data transmission, to monitor the age of received data transmissions by comparing time data therein with a reference time, and to discard the received data transmissions a predetermined period after the reference time.

Preferably, the control means is arranged to allocate a priority to received data transmissions and to adjust the order of retransmission of the received data transmissions to other stations according to the age thereof.

BRIEF DESCRIPTION OF THE DRAWINGS

FIG. 5 is an example of a typical data message structure employed by the network;

FIG. 6 is an example of a typical probe/acknowledgment message structure employed by the network;

DESCRIPTION OF EMBODIMENTS

The present invention has primary application in wireless data networks, including mobile radio or cellular telephone networks, two-way paging networks, meteor burst PCN data networks and low earth orbiting and geostationary satellite environments, where rapidly and greatly changing connectivity and platform population changes militate against the use of conventional networking techniques.

To this end, the invention provides a communication network which makes use of adaptive opportunistic communication between stations in the network. The network is a full mesh network which accommodates rapidly changing connectivity between stations and routes messages dynamically between stations on a co-operative basis to improve data throughput in the network, while minimizing power consumption and interference between stations. The invention optimises the network capacity by ensuring optimal utilisation of the available spectrum in terms of capacity (Erlangs) for a given area, a given spectrum allocation and a given infrastructure cost (Erlangs/km$^2$/Hz/$).

Figure 1:
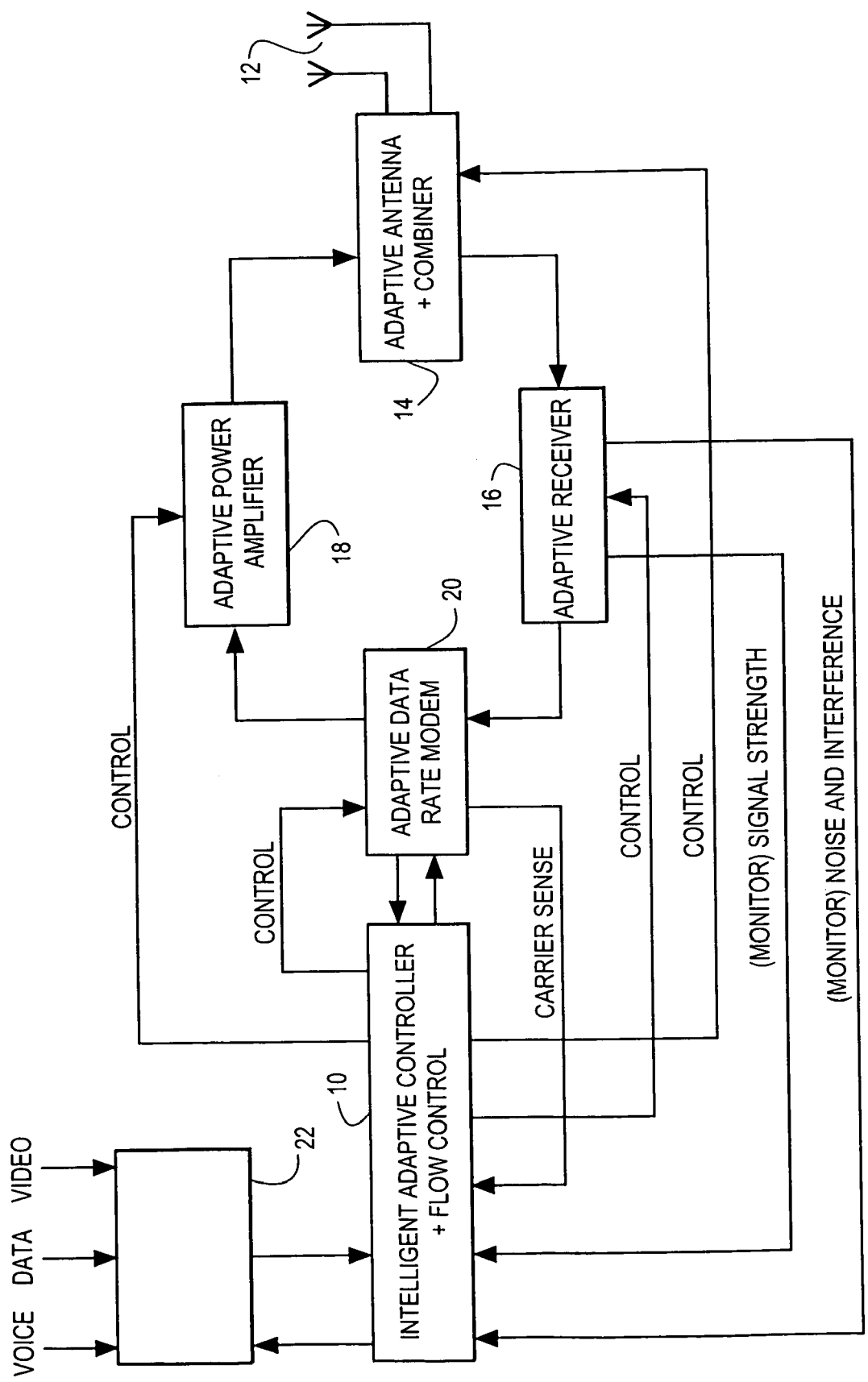
FIG. 1 is a simplified block schematic diagram illustrating the hardware of a single station of a communication network according to the invention.

Referring first to FIG. 1, a single network station is shown schematically in a highly simplified form. It will be appreciated that the network stations may be portable transceivers or fixed stations, or a combination thereof.

The heart of the station is a microprocessor-based controller 10 which operates under the control of stored software, which derives information by monitoring transmissions from other stations, both on an ongoing basis and in response to specific probe signals transmitted by the station. The station has one or more transmitting/receiving antennas 12 which are connected via a combiner unit 14 to an adaptive receiver 16 and an adaptive power amplifier/transmitter 18, all of which are controlled by the controller 10. Data is passed between the controller 10 and the receiver 16 and the transmitter 18 via an adaptive data rate modem 20. An input circuit 22 receives, for example, voice, data and/or video signals and includes analogue to digital converters with associated adaptive encoding processors, under the control of the controller 10, for converting the signals to a digital format and feeding them to the controller 10.

The controller 10 of each station continually analyzes data received from other stations which are within range, arising from their communication and interaction from time to time. The address information for other stations obtained in this way is collated and stored, and translated into connectivity information. The controller waits and monitors the activity of the other stations, seeking an opportunity either to communicate a message, as an originating station, or to relay a message to another station on behalf of a different originating station. When the controller detects a quiet time on the network, it transmits a probe signal which contains its own address and the address of the destination station, inter alia.

On receiving an acknowledgement signal from another station which is able to act as an intermediate or relay station, the controller then transmits a burst of data containing a message (either an original message or a relayed message). The transmission power, data rate, message lengths, message priority, message time to live, message retransmission rate and other parameters are controlled according to information derived from the acknowledged signal, relating to the characteristics of the channel or link between the stations at that time. The timing of the transmission is selected to take advantage of peaks in the signal strength or signal-to-noise levels typically experienced in a Rayleigh fading environment, so that the mode of communication is effectively an opportunistic time division multiple access system. By operating in peak mode, the required transmission power is reduced, reducing interference between stations, and reducing the necessity for the retransmission of messages.

The existence of the abovementioned peaks may be due, for example, to variations in signal path amplitude, frequency or phase variation, noise or interference, multipath effects, etc. The occurrence of peaks can be detected by monitoring physical characteristics of received signals or by monitoring bit error rates as a function of time.

(The design and operation of an individual transceiver apparatus operable as a station in the above described manner is described in greater detail below, with reference to FIGS. 8 to 13.)

Figure 3:
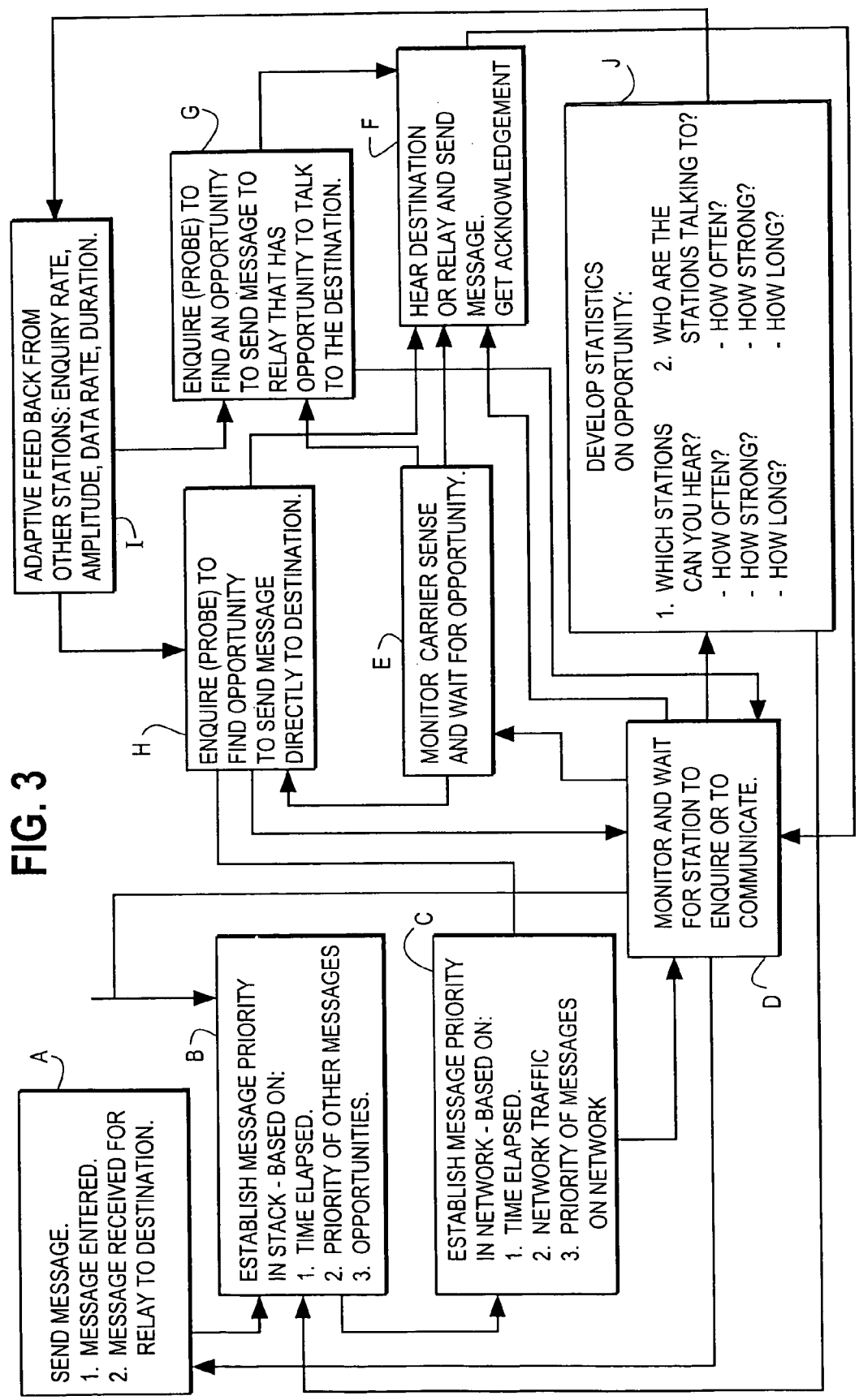
FIG. 3 is a state diagram illustrating a typical decision making process employed by the stations of the network.
Figure 4A:
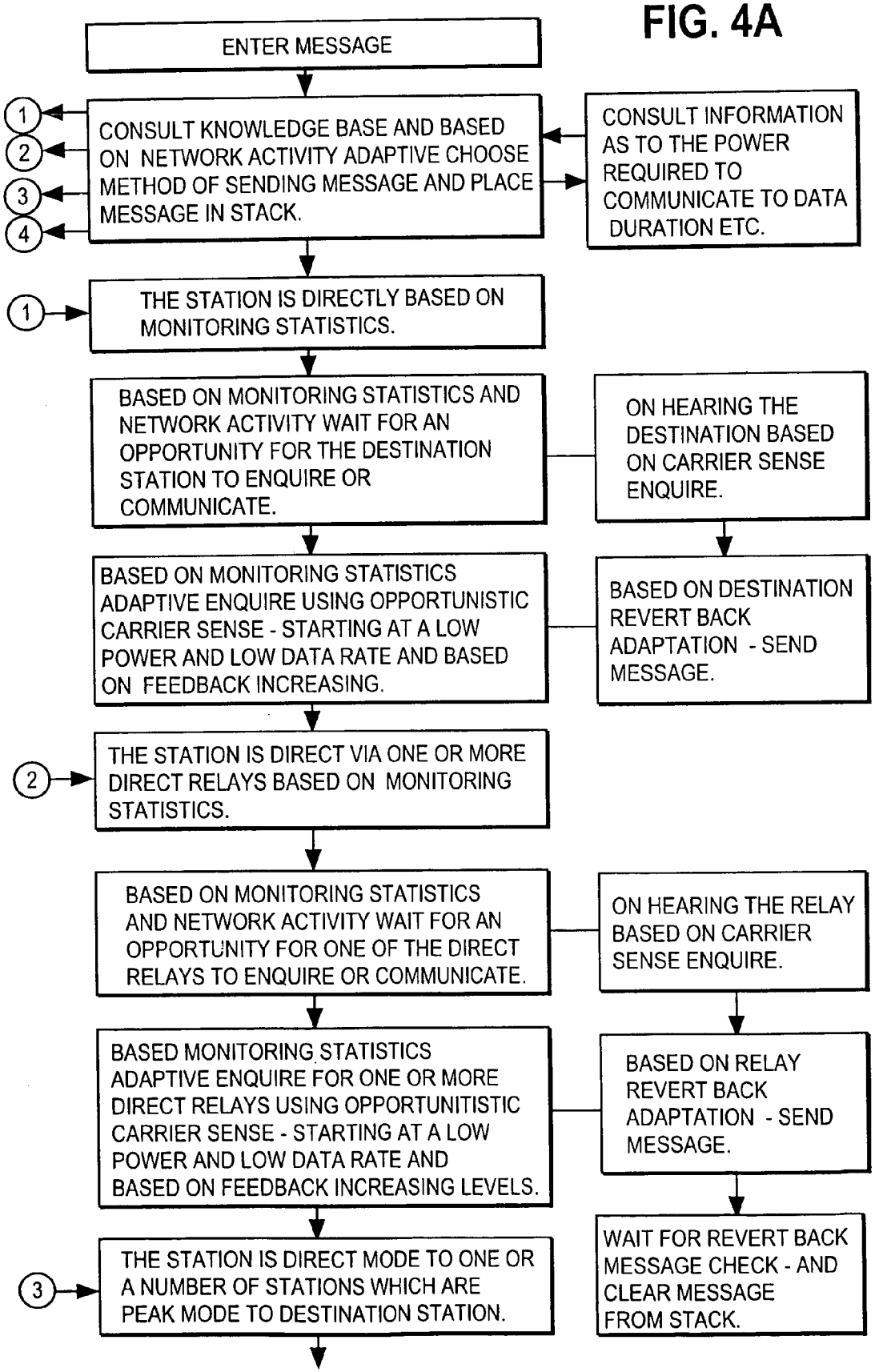
FIG. 4(a) show a flow diagram of a routing decision algorithm and 4(b) employed by the stations of the network.
Figure 4B:
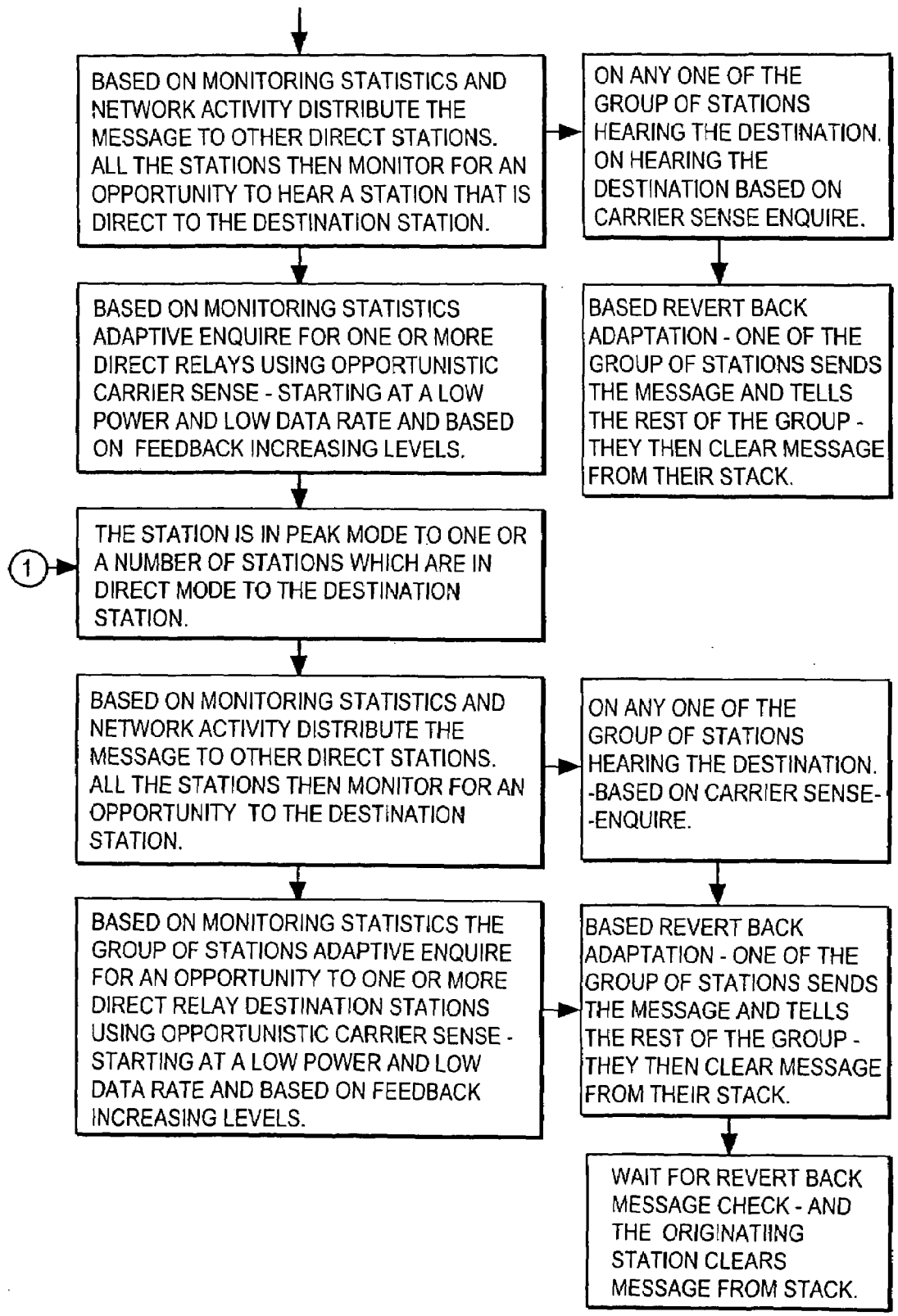

The state diagram of FIG. 3 and the flow diagrams of FIGS. 4a and 4b illustrate the operation of each station in the network. The state diagram of FIG. 3 illustrates the overall operation of a station, while the flow diagrams of FIGS. 4a and 4b illustrate a typical opportunistic message transmission procedure.

A key feature of the described system is the continual monitoring by each station of the activity of other stations in the network, both from the point of view of selecting an optimal channel for each transmission, and for selecting a station to which a message is to be transmitted. Each message transmitted over the network, whether it is a data message as illustrated in FIG. 5 or a probe/acknowledge message as illustrated in FIG. 6, contains its originating address, its destination address, and the address of the station relaying the message. Therefore, any other station monitoring the channel will hear which other stations are transmitting information, and which stations are relaying that information.

As messages pass from station to station, the originating and destination addresses in each message remain the same, but the intermediate address will be the address of the relaying station being used for the next "hop". As each station receives a message, it analyses the information it has derived from the channel and the stations around it and will then opportunistically, via a probe/acknowledge cycle, choose another intermediate station address, to relay the message onwardly via that station. Obviously, an originating station and a destination station may be able to communicate directly. However, in many cases the originating station will not be able to communicate directly with the destination station, but will be able to transmit its message to an intermediate station which it has heard talking to the destination station, either directly or via one or more additional intermediate stations. Each time a message is sent to an intermediate station which cannot directly communicate with the destination station, it will seek a further intermediate station that is in communication with the destination station or that it has heard talking to the destination station.

If the intermediate station cannot reach the destination station through any route (ie. it has received no information from other stations containing the address of the destination station) it will immediately revert back to the previous station, so that the station can attempt to find another route for transmission of its message.

It will be apparent that there are at least two different message types being transmitted over the network: a probe/acknowledgement message and a data message. The probe/acknowledgement messages are used primarily for control and feedback adaption, while the data messages are used for information/message transmission across the network. The data message can use any data rate, while the probe/acknowledgement revert back messages normally use a standard network data rate. However, probe/acknowledgement messages can be sent at different data rates, allowing the stations to establish what rate is best for the particular circumstances.

Referring now to FIG. 3, a typical opportunistic message send flow mode is illustrated. In block A, a message is entered or received for relay. The controller 10 then goes to block B where it determines the message's priority depending on the elapsed time since the message was entered/received, the priority attributed to other messages in its stack, and the opportunities it has, based upon the historical data developed in block J, to send the message. It then examines the information based upon network statistics and monitoring and establishes its message priority with respect to other message priorities on the network, taking into account network traffic. It then makes the decision as to whether it should monitor and wait to hear the destination station, or a station talking to the destination station, or whether it should enquire or probe to find the destination station or a relay (intermediate station) to the destination station. If the message is of low priority, the controller will go to block D and wait in monitoring mode for a period of time to hear either the destination station itself, or a relay talking to the destination station. Using this method, a single or double hop route is found.

Should the time set based upon the priority of that message elapse, the controller proceeds to block E where it waits for an opportunity to transmit by waiting for a break in network activity and for channel conditions to be suitable, and then enquires or probes for the destination address in block H. If the destination station responds, the controller proceeds to block I where it will, based on adaptive feedback, send a message to the destination station. The controller then returns back to the monitoring mode in block D.

Should the probe signal not receive an acknowledgement from the destination station, the controller will then probe for an opportunity to transmit via a relay or intermediate station (block G), and based on adaptive feedback from any such relay, send the message via that relay (block F). Depending on the results of the revert back message from that relay, the controller will return to the monitoring mode of block D.

When a station probes, it can also probe for any one of a particular group of stations, or probe for a station that has "heard" a particular station or a station that has "heard" a transmission to a particular station. Thus, probing can be used to locate other stations, or to find opportunities to communicate with other stations.

When the message is successfully transmitted onwards by the relay or intermediate station, it sends a revert back signal, together with further adaptive information, to the originating station. The originating station then returns to the monitor mode of block D and waits for an end-to-end message acknowledgement, as well as any further requests for relaying messages or receipt of messages. When a message reaches its final destination, the destination station will send back a message acknowledgement which might follow, due to the adaptive opportunistic operation of the network, a completely different route back to the originating station.

The probe/revert back messages employed by the network are used by the stations in an interactive manner in an analogous way to human beings communicating by "knocking" to attract each other's attention, "nodding" to indicate successful communication, and other adaptive interaction to modify the various parameters of their communication.

It will be appreciated that the stations of the network are not arranged in a hierarchy with controllers, base stations or parent stations. The network hierarchy is fully distributed and only message priority and transmission opportunities dictate message flow. Thus, the stations of the network work co-operatively to maximise the overall throughput of the network.

One of the objectives of the overall network is to co-operatively maximize the capacity in terms of Erlangs for a given spectrum allocation, a given area and a given equipment infrastructure investment. In other words, an objective of the network it to maximize Erlangs/$km^2$/Hz/$.

It will be noted that no dedicated routing information is passed across the network within either the data message or probe/acknowledge message structure, since no specific routing information is required for data to flow across the network.

Under normal conditions, the controller of each station will reside at either block D or Block H of the state diagram of FIG. 3. In other words, it will either be monitoring or waiting for transmission opportunities in a high activity network, or adaptively enquiring and receiving occasional feedback in a low activity network. The only reason for enquiries is to create message activity or to find a particular destination or relay opportunity. In a high-traffic situation, stations will not probe but will rely on hearing other stations communicating with each other, thereby deriving connectivity and routing information. Thus, normal operation will usually comprise waiting for a destination station to communicate and then instantaneously and opportunistically sending a message, either to that destination station directly or to an intermediate station talking to the destination station.

The described communication network has a number of specific characteristics:

1. The network allows any station to enter the network without the need to update network lists or to transfer network information.
2. Stations are able to adapt each other dynamically in a co-operative fashion so as to maximise message throughput and minimize contention between stations.
3. Stations are able to probe and request a channel between them in order to find opportunities of connectivity.
4. Stations are able to use revert back check acknowledgements, thereby dynamically adapting each other's operating parameters and informing other stations as to the status of message flow (e.g. message arrival, requests for retransmission of messages, etc).
5. Stations are able to learn and form knowledge bases which allow them to make an optimal first try at sending a message across the network, based upon monitored information and feedback from other stations.
6. Messages are not sent in a rigid fashion. In the absence of a message acknowledgement, messages will be resent. Messages that are "stuck" in the network will "time out" after a predetermined period. Message time (duration), time to live, and time of creation are embedded in the messages. This allows the transmission of time-sensitive data to be accelerated through the network depending upon its remaining time to live and also allows time-sensitive data (such as voice data) which is no longer relevant to be timed out.
7. A station has an "intelligent" stack of network messages. When any particular station is heard, a suitable message can be drawn from the stack dynamically and sent to that particular station, to make maximum use of transmission opportunities. Thus, where a station is routing messages on behalf of a number of different stations through a number of different other stations, it can opportunistically combine messages and forward them to other stations, reducing overhead on the network.
8. Each station can monitor link or channel quality in terms of signal strength, interference, signal-to-noise ratio, spike noise, etc., in order to find the best opportunity to send messages during periods of relative quietness and optimal signal strength.
9. Stations have the ability to transmit the minimum required power level required to reach the destination station or an intermediate station, thereby minimising interference to other stations. The transmission power is adapted on a transmission by transmission basis, and is increased or decreased based upon information contained in revert back check signals from other stations. Routing and relaying of signals is optimised so as to minimize stations transmitting at high power, thereby minimising interference and power consumption.
10. Stations always attempt to transmit using channel peaks, based upon availability, using reduced signal strength and further minimising interference with other stations.

The described communication network has a number of advantages compared with prior art systems. For example, if a station finds itself in a high noise environment, it may relay a message to an adjacent station, outside the noise environment, which can then in turn relay the message to the destination station. Alternatively, stations in a highly congested environment can reduce their power levels so as to effectively minimise interference, and relay messages amongst each other at low power and high data rates, thereby effectively using less time on the overall network. The network can be interfaced transparently to a conventional multi-hop stable routing network with complete transparency. For example, should more than the typical 3 hops be required to transmit a message from the originating station to the destination station, the message can be routed to the fixed network which uses conventional routing. The final 3 hops can again take place in the above described dynamic network.

In the described network, messages are routed "towards" their final destination one relay hop at a time, since each station is developing routing information for every destination and the originating station need not rely solely on its own information to determine the message route. Since, in many cases, the last hop to the destination station is the most difficult, the message may follow a number of extra hops to reach its final destination. Therefore, even with a nominal 3 hop system, since 3 hops are available at each intermediate station, 10 hops or more may be used to reach the destination station. The reason for this is that at each intermediate station, a brand new decision is made as to how to reach the destination station and, each time, 3 more hops are available. No memory of previous hops is kept, apart from the originating address. This method emphasises the importance of an "end-to-end" message acknowledgment, since in some cases the message may reach an effective dead end where there is no possibility of the intermediate station concerned hearing the final destination through a maximum of 3 further intermediate stations.

Figure 2:
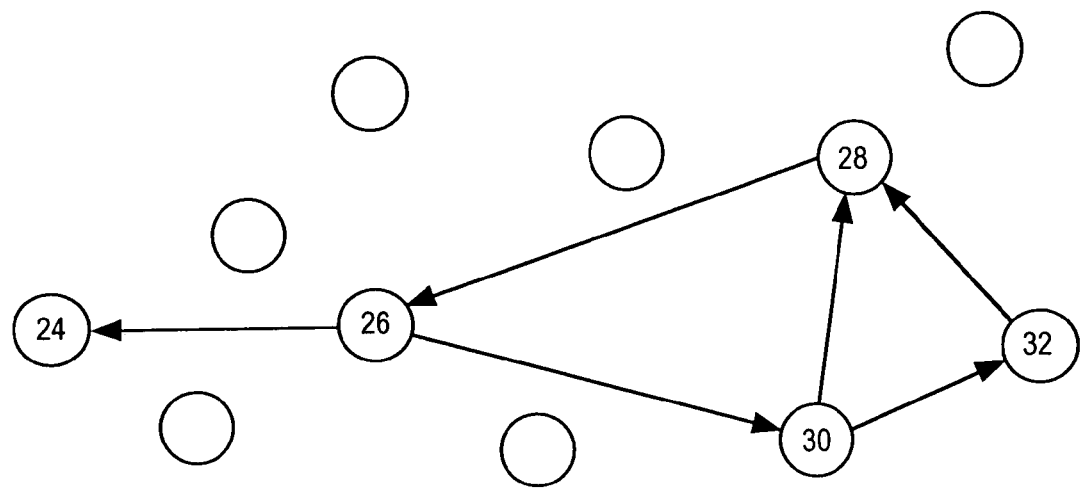
FIG. 2 is a simplified schematic diagram illustrating communication between originating and destination stations in the network.

In the example of FIG. 2, assume that the originating station 24 originally heard an intermediate station 26 communicating with another station 28, and therefore routes a message which it wishes to transmit to the station 28 via the station 26. If at that moment the connectivity between the stations 26 and 28 is lost, the station 26 may make an opportunistic decision to send the message via, for example, another station 30, which has higher connectivity to the station 28. It will be understood that the alternate routing from the station 26 via the station 30 to the station 28 is independent of the originating station and is an opportunistic decision taken at the station 26. Similarly, if the station 30 finds that it cannot communicate directly with the station 28, it too will opportunistically seek an alternative route, and may have to relay its message via another station 32.

With the opportunistic relay techniques employed, there is no attempt to minimize the number of hops, but rather to maximise network throughput and the speed of message flow. Many hops may be dynamically and opportunistically necessary to achieve this optimum. Since at each hop revert back checks avoid contention and overloading of any particular station, and message time-out (time to live) and end-to-end message acknowledgements prevent lost messages within the network clogging the system or never reaching their destination, as would be the case in flooding networks, the described network is extremely robust compared with fixed routing, adaptive routing or flooding algorithms.

As the above described network utilises a non-deterministic method of optimising itself and relies on adaptive feedback on a collective basis, no closed form method of predicting system capacity or delay time is possible. The only method of determining these parameters is through simulation and exercising on a simulation basis to determine parameters within the network.

Since the network stations learn from past results and adapt to monitored changing conditions, the flow of messages to themselves and amongst other stations, the monitored activity of other stations, and the adaptive feedback of other stations, groups of stations routing messages in the network can be considered as the co-operating decision makers of a team organisation. Each station has an artificial intelligence engine, which generates the routing variables and adaptation parameters. The parameters gathered from the monitoring engine and the long-term data base (see FIG. 13) play the role of the training patterns required for the artificial intelligence. The weights of the various parameters within the artificial intelligence are then adjusted and trained, based upon the dynamic changing parameters of the network. Since the stations adapt to one another, the overall network may be considered as a greatly parallel-distributed processing system with the ability to configure routes for data flow and to adapt the transmission power and other parameters of each station through dynamic learning. This provides a near optimum flow of data across the network and optimises network capacity.

The network may, alternatively, be considered as a greatly parallel-distributed processing system with the ability to configure parameters such as transmission power, data rate, rate and duration of signal transmissions, through dynamic learning. This allows dynamic responses to traffic conditions and changing propagation conditions measured through out the network. The network can thus operate to optimise message traffic requirements by adapting one or more parameters of operation.

Since the basic network protocol is very simple, requiring only two basic message types and the adaptive feedback ability described above, even very simple artificial intelligence can be used to drive each station in small, low capacity networks. As a network expands, the "intelligence" of the stations can be upgraded without the necessity of upgrading the basic link protocols. Since no routing information is passed around the network, low and high "intelligence" stations can be mixed without compatibility problems.

Since the network is a co-operative network, the only level of service that can be "guaranteed" to users is that based upon the level of priority and the extent of the network. Where network traffic becomes high and delays increase, additional stations can be added to the network, some being connected to more traditional high capacity networks, thereby maintaining overall message flow. However, the network of the invention will never fail catastrophically, since there is no single point of failure such as a base station or controller node.

Different users may have different levels of priority. For example, some users may have access to higher transmission power or high duty cycles and the ability to introduce messages with a higher priority embedded in them, as well as the ability to re-introduce messages more often, even if end-to-end acknowledgments are not received. The described system allows high priority and low priority users to be mixed in a common network.

Figure 7:
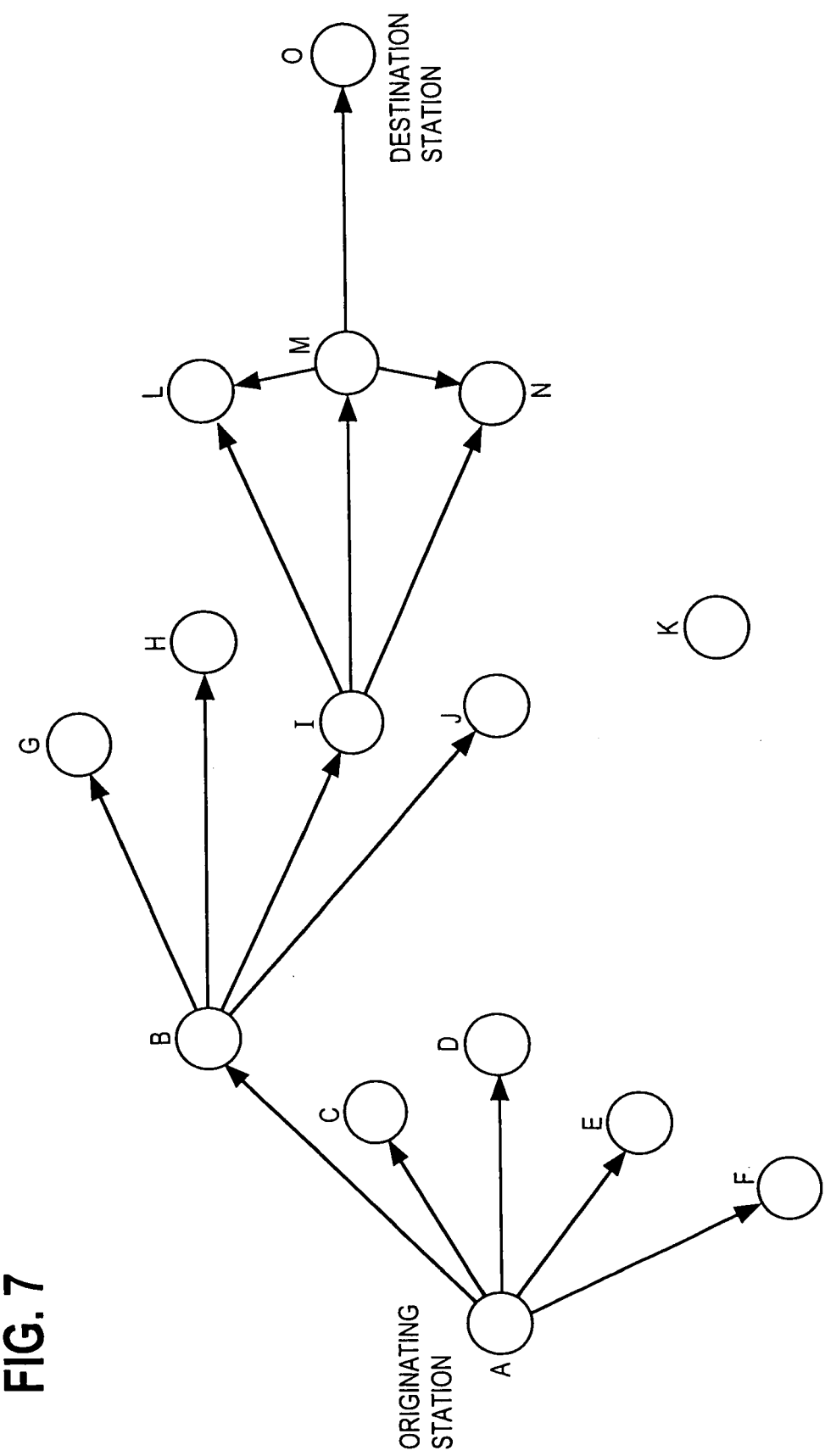
FIG. 7 is a diagram showing message flow in the network.

Referring now to FIG. 7, this diagram is used to explain the probability of message flow via the network. At the originating station A the messages are entered and opportunistically wait for any station which has a high probability of routing a message to the destination station O. Assume that stations closer to the destination have a higher probability of communicating with the destination. The highest probability of relay is from, say, the originating station A to a station B. Assume that peaks of opportunity exist between the originating station A and all of the stations B to O in an opportunistic environment, it is possible for the message to be routed directly to the destination station O from the originating station A, but this has a very low probability.

From the first relay B, it is possible that the message can be sent to any of the stations G to O. Assume that the message is transmitted from the station B to a station I, based upon an opportunity. Again, the station I might transmit to any of the stations L to O. Assume that the station I transmits the message to a station M, the highest probability route will then be to the destination station O itself.

Therefore, as the message is routed hop by hop, the number of stations with a higher probability of communicating with the final destination station decreases, until at the final hop there is only one choice. It is therefore an imperative in the network to make the number of opportunities of intermediate hops as large as possible, and hop to a penultimate relay selected so that the last hop has a very high probability of success. In the network, a higher probe rate and higher general network activity will increase the number of opportunities, and therefore the probability of finding an opportunity. As the message is routed towards the destination, and the number of "choices" is reduced, the size of the hops must be reduced or, alternatively, the probe rate or level increased. This emphasises the importance of the "extra" hops that may be necessary to make the last hop one of extremely high probability. Since the system is always looking forward 3 hops, it is possible to ensure that the last hop has a higher probability.

Since the total probability of a message getting from the originating station to the destination station it is a product of the intermediate probabilities, the objective of the network is to keep the probability of success of each hop as close to unity as possible. Equation 1 gives the probability of success of a single hop:

$$P_{HOP} = \left(1 - \prod_{i=1}^{n}(1 - P_i)\right) \quad (1)$$

where $P_i$ is the probability of transmitting to a station with some connectivity to the originating station and higher connectivity to the destination station, and where n is the number of stations.

The probability of each intermediate hop is a strong function of the number of "choices". Therefore, even if the intermediate hops have a low probability, the probability of finding any one of them is high. Therefore, large hops with low probability can be made for the first hops, providing the last hops have high probability. In this case, the total probability, which is a product of all the intermediate hop probabilities, will be high. (See equation 2).

$$P_{TOT} = P_{HOP1} \times P_{HOP2} \times P_{HOP3} \qquad (2)$$

For example, low power stations with low connectivity between themselves can route messages on behalf of each other towards destinations, providing there are sufficient of them. In the case of a vehicular network, vehicles can relay messages between each other and towards fixed dispatch centres which have higher power and duty cycle, and will provide a high probability last hop to the destination vehicle once messages are routed close enough to them from other vehicles.

Similarly, in a utility environment where homes have low power, low performance radios, messages can be routed from home to home until the messages are sufficiently close to a data gathering or data dissemination station which has higher power and a higher duty cycle and which can ensure a high probability last hop.

Individual stations can "scavenge" messages opportunistically in order to enhance connectivity. For example, if a first station is communicating with a second station, a third station, which has determined that it is better placed to act as a relay between the first station and the desired destination station, or that it can act as a relay between the first and second stations, can actively intervene to act as a relay, thereby allowing the first and second stations to reduce their transmission power levels.

The priorities of the system can therefore be summarised as 1. making the number of options as high as possible;
2. ensuring that the probability of intermediate hops will collectively provide a high probability;
3. ensuring that the message is routed to a final relay point which has a very high probability of reaching the final destination; and
4. always routing messages towards stations with higher connectivity.

Referring now to FIGS. 8, 9, 10 and 11, the hardware of the station of FIG. 1 is illustrated in greater detail. The prototype of the station which is described below was implemented as a portable radio telephone transceiver for use in a voice communication network. The prototype transceiver is intended to be used as a vehicle-mounted unit and was constructed in a housing which can be mounted under the dashboard or in the luggage compartment, for example, of a motor vehicle and which is supplied with 12 volt DC power from the vehicle electrical system.

It will be appreciated that the transceiver could be provided in a miniaturised battery powered form for use as a personal transceiver, or could be used as a base station or a fixed point relay, for example, mounted on a tower or mast with a suitably efficient antenna.

Figure 8:
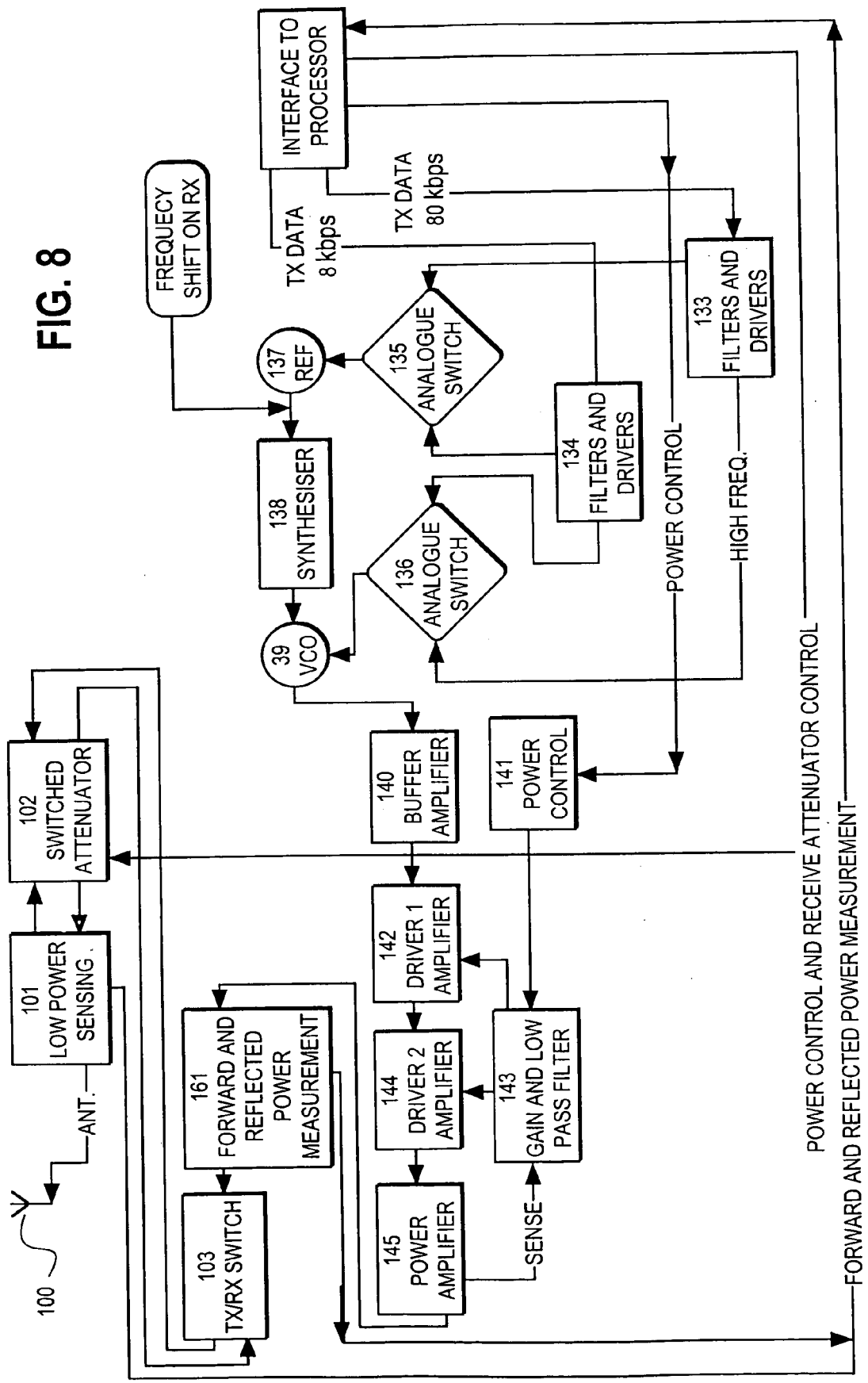
FIG. 8 is a schematic block diagram of a transmitter module of a transceiver according to the invention.

The circuitry of the transceiver is built in a number of modules, which correspond generally to the block diagrams of FIGS. 8, 9, 10 and 11. In this regard, FIG. 8 shows a transmitter module of the transceiver, comprising an adaptive power amplifier with an output power range from minus 40 dBm to 70 watts, a frequency synthesiser MSK modulator with dual data rates of 8 kilobits per second and 50 kilobits per second, power control circuitry and power protection circuitry. FIG. 8 also shows power measurement circuitry and a receive/transmit attenuator of the transceiver.

Figure 9:
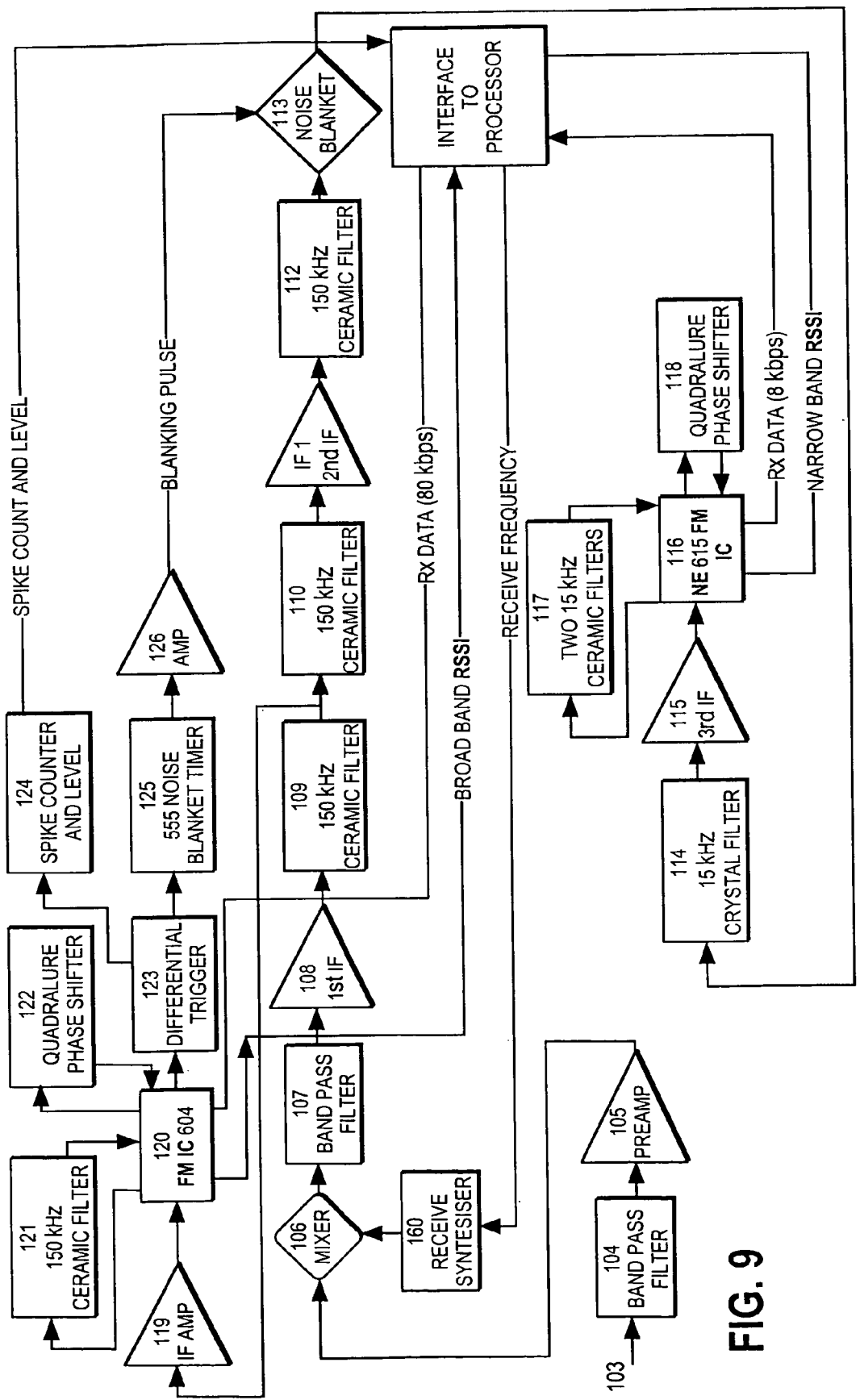
FIG. 9 is a schematic block diagram of a receiver module of the transceiver.

FIG. 9 shows a receiver module of the transceiver, which includes a low noise preamplifier, a mixer, two IF stages and two MSK demodulators operating at 8 and 80 kilobits per second.

Figure 10:
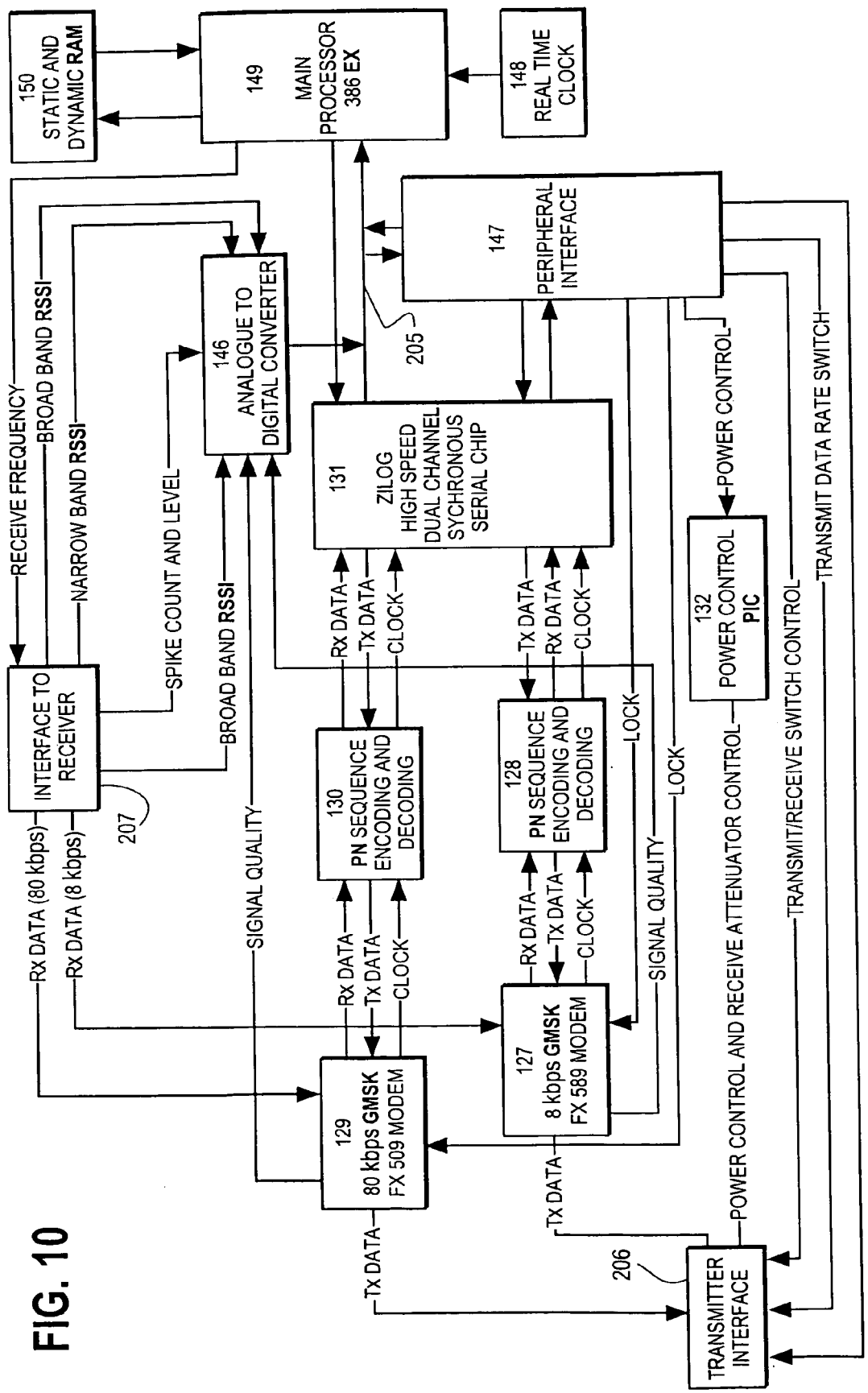
FIG. 10 is a schematic block diagram of a main processor and modem interface module of the transceiver.
Figure 11:
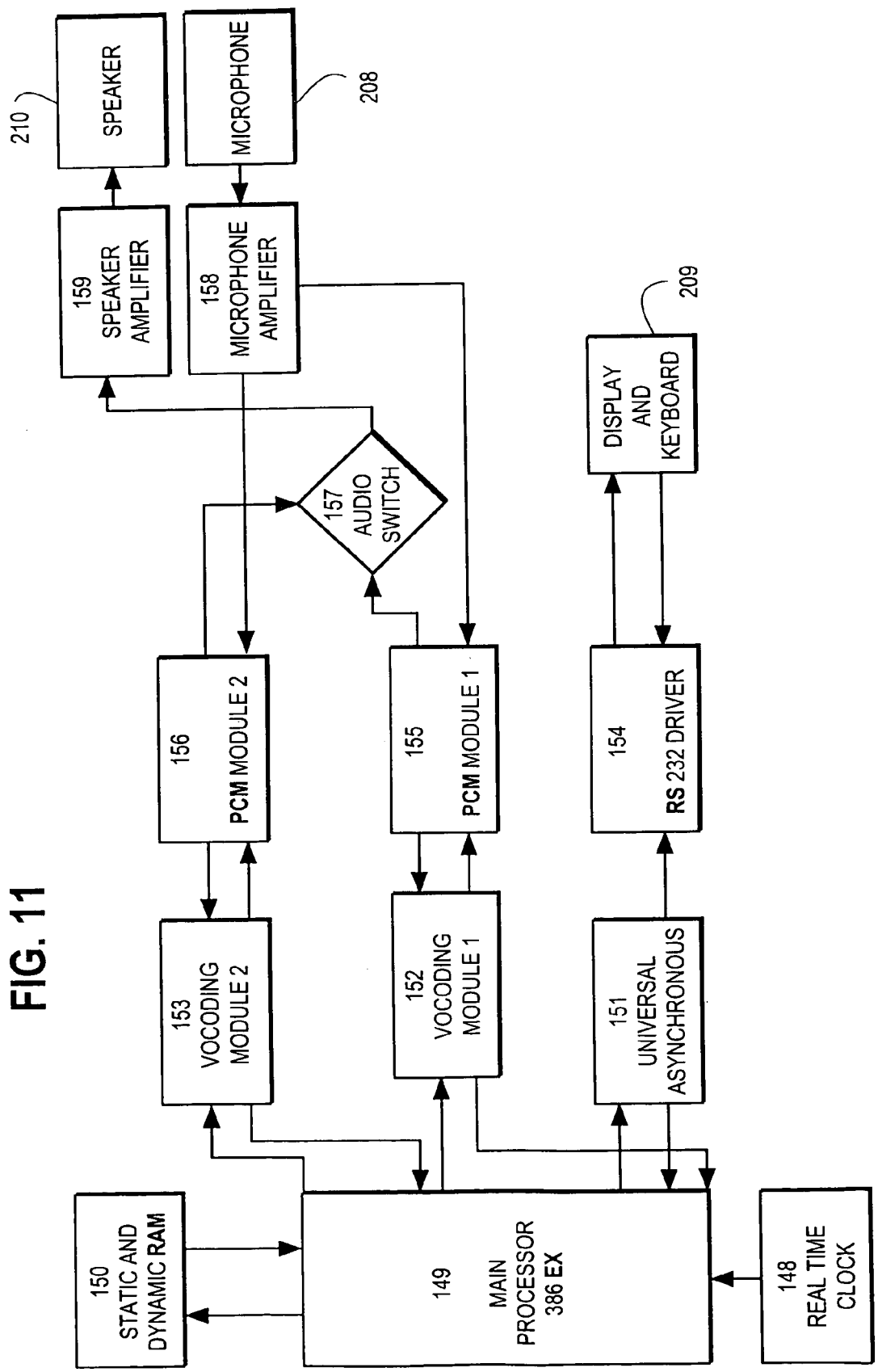
FIG. 11 is a schematic block diagram showing the main processor together with a dual vocoder interface module of the transceiver.
Figure 12:
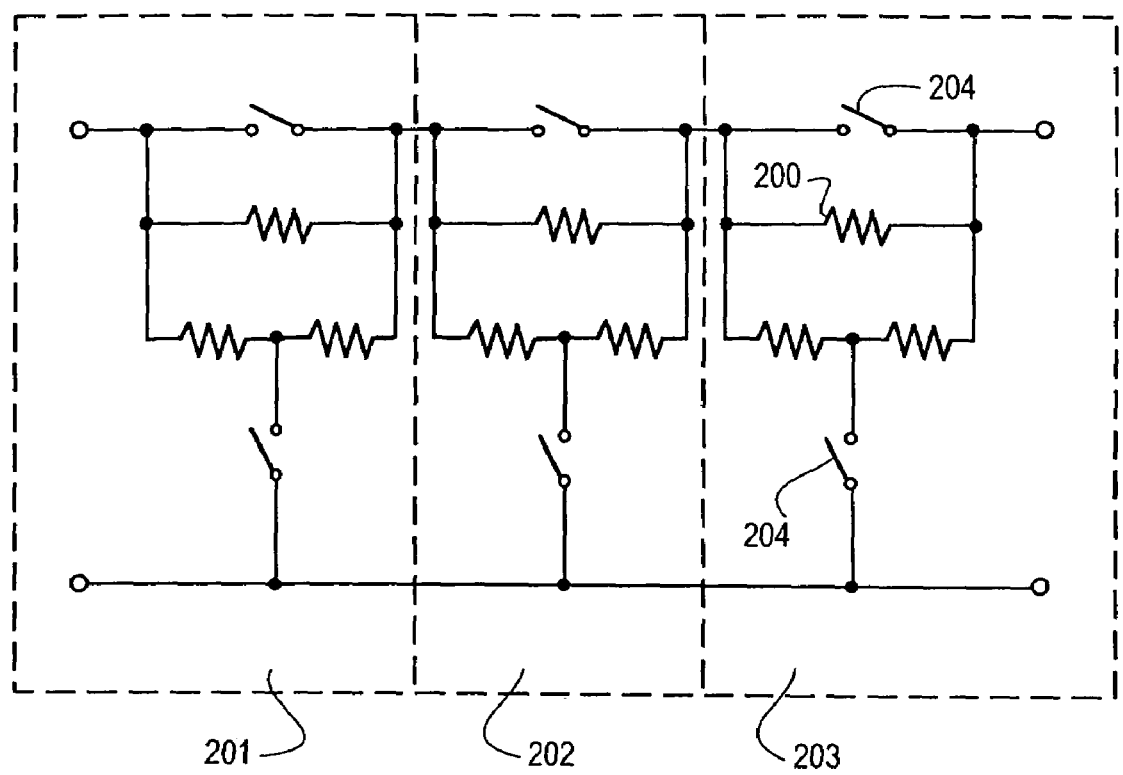
FIG. 12 is a schematic diagram of a multi-stage switched attenuator of the transceiver.

FIG. 10 shows the main microprocessor of the transceiver together with associated interface and control circuitry, while FIG. 11 shows the microprocessor together with a dual vocoder interface and other user interface components.

Referring to FIG. 8, an antenna 100 is connected a low power sensing circuit 101, a transmit/receive switch 103 and a forward and reflected power measurement circuit 161 to a power amplifier 145. The power amplifier is fed by first and second driver amplifiers 142 and 144 from a buffer amplifier 140, which is in turn fed with the output of a voltage controlled oscillator (VCO) 139 which forms part of a modulator/synthesiser circuit. In this circuit, a synthesiser 138 runs at the transmit frequency (in the 45 to 50 MHz range) and is two-point frequency modulated, meaning that the frequency reference source 137 for the synthesiser is modulated by the low frequency component in the data to be transmitted, while the VCO 139 is modulated by the high frequency component of the data. The modulation is carried out by respective analog switches 135 and 136 controlled by respective driver circuits 133 and 134 which are fed with data to be transmitted at the relevant data rates at which the transmitter operates. The result is a GMSK signal which is fed to the amplifier section of the transmitter.

When receiving, the operating frequency of the synthesiser 138 is shifted a short distance away from the receive frequency of the transceiver, a distance just greater than the bandwidth of the widest IF filter in the receiver. This is done by feeding the output of the frequency reference 137, which operates at 10 MHz into a divider that counts cycles and at the overflow value of the counter removes a cycle going into the synthesiser. This allows rapid shifting of the synthesiser frequency on transmission, without the need for reprogramming of the synthesiser when the transceiver goes into receive mode, and avoids the delays that would be involved in reprogramming or restarting the synthesiser when switching from receive to transmit mode and vice versa.

For successful implementation of a network employing transceivers according to the invention, it is important to control the transmission power so that it is adequate for the signal path conditions applying at any moment, but not excessive, which would result in unnecessary power consumption and interference between adjacent stations. Based on its monitoring of the channel in use, the processor circuitry of the transceiver generates a power control signal via a power control circuit 141 which is applied to a comparator circuit 143 comprising a gain control circuit and a low pass filter. The comparator circuit 143 compares the power control signal with a transmission power measurement signal, and outputs a control signal which varies the gain of the second driver amplifier 144 to increase or decrease the transmission power accordingly. This circuit operates to adjust the transmission power to correspond to the power of signals received on the same channel, so that transmissions take place at an adequate but not excessive power level.

The buffer amplifier 140 regulates the output level from the modulator VCO 139 to a constant level, while the first and second driver amplifiers 142 and 144 are class B amplifiers, with the gain of the second driver amplifier 144 being controllable. The amplifier 145 is a class C amplifier, and its current consumption is measured to provide an indication of the output transmission power of the transceiver. The comparator circuit 143 effectively provides a feedback loop which adjusts the output power of the transceiver towards a setpoint controlled by the power control circuit 141, and varies the output of the power amplifier from 100 mW to 70 W.

In order to increase the range of output power of the transmitter, a controllable attenuator is switched into the output path when output transmission power lower than 100 mW is required. The attenuator can apply up to 60 dB attenuation in 10 dB steps. Thus, the overall transmission dynamic range can be adjusted over a range of 100 dB. The attenuator 102 comprises a ladder of resistors 200 which are arranged in three groups 201, 202 and 203, with values calculated to provide an attenuation of 30 dB, 20 dB and 10 dB respectively. (See FIG. 12.) The resistors are switched in and out of circuit by controllable switches 204 comprising PIN diodes which are effectively biased on or off by control signals from the processor circuitry of the transceiver.

Depending on the combination of attenuator sections which are switched in or out, a maximum attenuation of 60 dB, in 10 dB steps, is possible. Thus, the output transmission power of the transceiver can be varied between −40 dBm and 50 dBm, with rapid switching between power levels. This allows the transmitter circuitry to output consecutive bursts of data at different power levels as required. The attenuator circuit 102 is also used in input power measurement, since the power measurement circuit 161 can not operate over a very large range, typically only 60 dB. By adjusting the switched attenuator appropriately, the effective measurement range of the power measurement circuit 161 is extended to 120 dB.

Referring now to FIG. 9, the receiver module of the transceiver comprises a high Q bandpass filter 104 which is connected to the transmit/receive switch 103. The filter 104 has a bandwidth of approximately of 1.5 MHz and a low insertion loss. The filter 104 is followed by a low noise preamplifier 105 with a high dynamic range, the output of which is fed into a mixer 106 which forms part of a 10.7 MHz IF strip. The output of the mixer is fed through a bandpass filter 107 to a first high-gain IF amplifier 108. The output of this amplifier is fed to first and second ceramic filters 109 and 110 which provide bandpass filtering, centred on 10.7 MHz of 150 kHz. A second IF amplifier 111 follows the filters 109 and 110, to compensate for their insertion loss. A further ceramic filter 112, with the same characteristics as the filters 109 and 110, follows the second IF amplifier 111, to further improve the selectivity of the receiver. This filter also provides a time delay which is required for noise blanking (see below). The output of the filter 112 is fed to a noise blanker circuit 113 which is essentially a controllable switch controlled by the output of an amplifier 126 which provides a blanking pulse output and which is used to "blank" noise pulses, with attenuation of 40 dB when open. The output of the noise blanker circuit 113 is fed through a narrow band 15 kHz crystal filter 114 which provides a selectivity of 15 kHz centred on 10.7 MHz. The output of this filter is fed into a third IF amplifier 115 which has sufficient gain to overcome the losses of the previous stages and to provide sufficient output levels to drive the NE 615 FM integrated circuit 116 which follows.

It can be seen from the above description that the IF strip of the receiver module provides gain and selectivity in two bandwidths simultaneously, namely 150 kHz and 15 kHz. This allows simultaneous measurement and demodulation within two different bandwidths and at two different data rates. The use of parallel demodulation chains with parallel data synchronisation and demodulation of the data allows simultaneous data to be demodulated from two different stations at two different data rates, with one of the two being chosen, based upon opportunistic decisions.

The NE 615 FM integrated circuit 116 is used to implement a 455 kHz IF strip. The device incorporates a mixer/oscillator, two limiting intermediate frequency amplifiers, a quadrature detector, a muting circuit, a logarithmic received strength indicator (RSSI), and a voltage regulator.

The output from the third IF amplifier 115 is converted in the integrated circuit 116 to a 455 kHz signal which is fed through a ceramic filter 117 having a bandwidth of approximately 15 kHz centred on 455 kHz, and then amplified to provide an RSSI output signal. This amplified signal is passed through a second ceramic filter 117, providing further selectivity, and amplified again, providing an overall gain of 90 dB. This makes it possible to measure a received signal strength in the range −130 dBm to −30 dBm, a 100 dB range. The range of measurement is extended by 60 dB through the use of the switched attenuator circuit 102 (described above) to provide a total measurement range of 160 dB.

The integrated circuit 116 includes a Gilbert Cell quadrature detector which operates in conjunction with a quadrature phase shifter 118 to provide FM demodulation of the incoming minimum shift key (MSK) data. This data waveform is taken from the output of the quadrature detector through a filter and is available as narrow band output data (8 kbps). The use of a quadrature detector provides a rugged and effective method of demodulation which is immune to frequency offsets and phase distortion and does not require carrier recovery time.

A wide band IF strip is fed from the output of the first 150 kHz ceramic filter 109 and comprises a gain stage 119, the output of which is fed into an FM IF integrated circuit 120 comprising an NE 604 chip. This device is a low power FM IF system incorporating two limiting intermediate frequency amplifiers, a quadrature detector, a muting circuit, a logarithmic received strength indicator and a voltage regulator. The integrated circuit 120 uses a 150 kHz ceramic filter 121 to provide a wider bandwidth RSSI output signal, so that the receiver module can make high dynamic range signal strength measurements simultaneously in a 15 kHz and a 150 kHz bandwidth.

A quadrature phase shifter network 122 is provided to allow the integrated circuit 120 to demodulate MSK data in a similar manner to the integrated circuit 116.

Apart from the wide band data demodulation and signal strength detection functions described above, the integrated circuit 120 is also used for noise blanking of narrow band received data. This is done by detecting short noise spikes which are common in low VHF bands and are significantly shorter than the data period. For example, in the 455 kHz IF circuit (block 116) data is detected at 8 kbps, corresponding to a bit period of 125 microseconds. If a noise spike of, say, 12 microseconds occurs, this will inject noise for only 10% of the bit period. If the noise spike is passed through the 15 kHz filter, the pulse duration will become approximately 60 microseconds, resulting in significant distortion of a single data bit. The noise blanker therefore attenuates such noise pulses before they enter the narrow band filters of the 455 kHz IF stage.

If a typical noise pulse is passed through the 150 kHz filters 109, 110 and 112 of the 10.7 MHz IF strip, the pulse duration will be approximately 6 microseconds, and if it is removed before the 455 kHz IF strip, it will have a negligible effect on the bit error rate of the 8 kbps data.

For this purpose, a differential trigger 123 and a timer 125 generate short pulses corresponding to the duration of the noise pulse once the latter has passed through the various filters. Since the noise pulses are typically only nanoseconds long, the duration of the pulses at the output of the filters will be set to approximately 10 microseconds and the timer 125 is therefore set to generate 10 microsecond blanking pulses. This delay corresponds to approximately 10% of the period of a single data bit.

A spike counter and level detection circuit 124 is provided to allow the detection and counting of noise spikes, which information can be used as an adaptive feedback parameter to select the duration of data transmissions, and the data repeat rate, etc. For example, if noise spikes are measured at a 100 Hz rate, the wide band data could be transmitted in bursts between noise spikes at 10 ms intervals, thereby achieving a significant improvement in performance.

The noise spike detection signal from the counter circuit 124 can be used together with bit error performance data and RSSI information to provide a number of adaptive feedback parameters for use in the operation of the transceiver.

Finally, a receive synthesiser 160 provides a local oscillator at 55.7 MHz to 60.7 MHz, mixing down from the 45 MHz to 50 MHz RF frequency to the 10.7 MHz. This synthesiser is required to hop in frequency, based upon instructions from the main processor, independently of the transmit synthesiser 138. The synthesiser can be programmed to hop in frequency steps which correspond to channels having a bandwidth which is the same as that of the narrow band data. Since the narrow band data is within a 25 kHz channel, the synthesiser may be programmed to hop to any channel within the bandwidth 45 to 50 MHz in 25 kHz steps. This allows the receiver to demodulate, within milliseconds, data on different receive channels between 45 and 50 MHz.

The described transmitter/receiver modules lend themselves to frequency hopping operation, with the transmission and reception channels being hopped together or independently. It will be appreciated that other transmission schemes, such as direct sequence spread spectrum (DSSS) operation, might be preferable in particular applications.

As each station transmits probe signals and monitors received signals, it switches from one frequency channel to another, recording information as to which other stations are available on the various channels and noting their identity, signal strength, frequency of transmission and duration of transmission. Apart from switching between transmission and reception frequencies, each station can also (where applicable) select between different antennas which are optimised for different frequencies or transmission directions, for example.

A group of stations may hop synchronously or semi-synchronously. For example, a group of stations relaying messages on behalf of one another may switch frequencies/channels as a group. The operation of the network in the above described frequency adaptive manner can be considered as a form of slow frequency hopping, frequency scanning, frequency division multiple access methodology.

Stations which provide a mix of coverage and capacity and are available as opportune links for one another will tend to congregate on particular channels, or hop channels together in a synchronous manner. Since the transmission/reception frequency is one of the adaptation parameters of the apparatus of the invention, it can be changed as required using probe and revert back signals. For example, one station may request another station to move to another frequency to "meet" it there, to provide an opportune relay link, or to reduce traffic on another channel.

Adjustment of the transmission/reception frequency may also be employed in the case of high priority data, where a free channel can be cleared and high power, high data rate transmissions used directly between two stations, for example.

Certain frequencies may be used as congregation or meeting frequencies with multiple hop, full connectivity, where stations exchange small amounts of information at lower power levels and high data rates, thereby minimising their on-air time and maximising the overall network connectivity and information exchange. If two stations are able to establish connectivity through multiple hops on such a channel, they may elect, by co-ordinating between themselves (and possibly one or more intermediate relay stations) to change to an opportunistically selected channel, which has low noise, low interference and/or low traffic for both the source, the destination and the relay stations. This type of opportunistic frequency change will most often occur when it is necessary to exchange large volumes of data, normally requiring increased power levels to improve connectivity. If the stations are unable to connect with one another at a first chosen frequency, they can choose another channel or return to the original calling channel to re-establish connectivity.

Thus, it will be understood that the frequency used between stations is adapted in the same manner as other parameters such as the transmission power, the data rate, or the timing of a transmission to match a channel peak.

The combination of adaptive channel hopping in conjunction in with adaptive transmission power and adaptive data rates is an important feature of the invention. Opportunistic channel hopping can be used to find quiet channels with low interference or noise, or to find a channel with traffic on it in order to locate a particular relay or destination station. Therefore, in quiet networks the stations may tend to congregate on a single channel, making efficient use of that channel through adaptive power and adaptive data rate transmissions. However, as the traffic on the channel increases, stations can opportunistically hop off the channel to adjacent channels, to exchange large volumes of data or to form subgroups. Individual stations seeking transmission opportunities can hop between groups of stations operating on different channels, and in certain circumstances stations may hop together as a group from channel to channel for the purpose of creating transmission opportunities.

Since in general propagation conditions frequency selective fading and frequency dependent interference occur, channel hopping creates transmission opportunities with different characteristics which, in conjunction with other time varying channel characteristics, effectively adds an additional variable into the opportunistic environment used by the network.

The effect of the above described opportunistic frequency hopping operation of the network is that stations operating as intermediate or relay stations may receive a message from a particular station on one channel, and hop to a second channel to pass the message on efficiently. For example, an originating station may not know on which channel to find the destination station, but through the probing process, a relay station opportunistically takes the message from the originating station and transmits it to the destination station, which it has recently heard on another channel. Establishing the channels which stations are using is therefore a distributed function, with numerous stations scanning continually and assisting one another in finding which channels other stations are on. If a station cannot find the destination station, and has probed on a number of different channels, the message is passed on, allowing other stations to probe for the destination station on various channels.

The overall receiver allows simultaneous demodulation, synchronisation and capture of data at two different data rates with a high range of dynamic signal differences. Although the described embodiment caters for two different data rates, it is possible to extend the concept to cater for further parallel data rates, typically spaced by orders of magnitude. For example, in the described receiver, provision could be made for data rates of 800 kbps, 8 Mbps and 80 Mpbs in addition to the 8 kbps and 80 kbps rates. In a typical network, the highest data rate should be chosen, based upon the spectrum allocation, to fill the complete spectrum allocation. Therefore, stations can call each other opportunistically and dynamically at any data rate, and all other stations can monitor and demodulate the transmissions. Due to the isolation between the different data rates, in many circumstances a station will be able to demodulate the transmissions of two different stations simultaneously, one at a higher rate and one at a lower rate.

Turning now to FIG. 10, the main microprocessor and modem interface module of the transceiver are shown. The main microprocessor 149 is a type 386 EX chip with associated static and dynamic RAM 150 as well as several EEPROM's (not shown) which program the operation of the receive, transmit, interface and processing functions of the transceiver. The processor 149 has an associated real time clock 148.

Via a main bus 205, the processor communicates with a main analog to digital converter 146, a main peripheral interface 147, and a high speed serial controller chip 131, which in the prototype transceiver was a Zilog Universal Serial Synchronous controller chip.

Data to be received and transmitted is fed via the serial controller 131 to respective encoder/decoders 128 and 130 and their respective GMSK modems 127 and 129, operating at 8 kbps and 80 kbps. In the prototype, the modems were type FX 539 GMSK modems. Output data is fed from the modems 127 and 129 to a transmitter interface 206 controlled by the peripheral interface 147 and a power control circuit 132. The modems include a lock input which is controlled by the processor, allowing the modems to search for and acquire signals quickly and then to be locked on, thereby reducing noise and interference, in particular interference resulting from other stations. This lock feature allows the modems to pick out stations under processor control, which is important to the operation of the invention.

Incoming data from the receiver is fed via a receiver interface 207 to the modems 127 and 129 and via the encoder/decoders 128 and 130 to the serial controller 131 for processing by the main processor 149. The broad and narrow band RSSI signals and the spike counter level signals from the receiver module are fed via the interface 207 to the analog to digital converter 146 for processing by the processor 149.

Referring now to FIG. 11, the vocoder interface nodule of the transceiver is shown. The module comprises dual vocoders 152 and 153 which are utilised, in the described embodiment, to convert voice signals to data for transmission between stations in a network. The vocoder interface module essentially converts speech into a digitised form, and then compresses and "packetises" it before passing it to the processor circuitry.

The vocoders used in the prototype transceiver were Qualcomm type Q4400 vocoders. In operation, audio signals from a microphone 208 are fed via a microphone amplifier 158 to first and second PCM modules 155 and 156 which sample the audio data and convert it to a PCM format. The PCM data is fed to the data input of each vocoder and internally grouped together into 20 millisecond frames (160 PCM samples per 20 millisecond frame). These frames are encoded into packets and output to the main processor 149 every 20 milliseconds.

Each packet of compressed speech data is transferred to the processor in a TX frame response packet, which contains the data rate for the frame as well as the valid data bits. The processor determines the maximum and minimum data rate limits for the next 20 millisecond frame to be processed. Each packet of compressed data received by the processor 149 is formatted for transmission, with a processing delay between arrival of the first PCM sample in the 20 millisecond frame and the completion of the encoding process for that particular frame being approximately 47.5 milliseconds. Once the frame of data is in the processor, the processor reads the data rate bit and strips out redundant information before packetising the data and outputting it via the serial controller chip 131.

Due to the opportunistic burst mode operation of the transceiver, it is important to overcome the potential disadvantage of having a lag in the rate of adaptation of the voice signal, which could result in losing transmission opportunities which happen in windows significantly smaller than 20 milliseconds. This is why two parallel vocoders 152 and 153 are used, providing two (or more, if additional vocoders are used) options for use by the main processor 149. For example, the processor 149 can instruct the vocoders to operate fixed rates of, say, 4000 and 9600 bps, and select data from either vocoder according to a calculated opportunity. Thus, the processor would have a choice of two different data packet sizes for transmission at each available transmission opportunity. Alternatively, if one packet is sent at a higher data rate and is not successfully received, a lower data rate version of the same frame, transmitted together with the subsequent frame, could be inserted into the next packet that is transmitted. This provides a method of buffering of the transmitted data packets and effectively providing a form of opportunistic data rate transmission as well as a data duration adaptation feature.

It will be understood that more than two parallel vocoders could be employed, operating at different data rates, with their output packets being placed in parallel buffers available for opportunistic transmission. Those packets which are not transmitted, due to transmission of a packet from a different vocoder, are then simply erased and replaced with subsequent packets.

Apart from operating at different data rates, the vocoders can be set with different vox settings and different coding delays. Thus the processor could, for example, set one of the vocoders with a low vox setting and a low data rate, with the other being set at a high vox setting and a high data rate. This scheme can be used to ensure that the beginning of a speech transmission is captured, with a switch subsequently being made to a high data rate, high quality transmission. The provision of dual vocoders also allows one vocoder to be used to demodulate data while the other modulates data, therefore avoiding delays in interactive speech, with one vocoder being opportunistically switched over to pick up the beginning of a reply while the other is still playing out the end of the received speech. This arrangement significantly reduces delays, particularly in an interactive situation.

Received data is sent to one of the vocoders 152 and 153, while the other receives blanked or erased data frames. Blanked frames are also output when corrupted data is received, to prevent a distorted output from the vocoder. In these circumstances, the vocoders interpolate or reconstruct the missing data. The received output from the vocoder 152 or 153 is fed to the respective PCM module 155 or 156, with the audio output from the relevant module being selected by an analog audio switch 157. The selected audio output is fed via a speaker amplifier 159 to a loudspeaker 210.

The overall adaptive rates of the vocoders are adaptively changed within broad boundaries due to long term feedback over seconds, and opportunistically changed within tens of milliseconds, based on selection of the buffered data frames for a number of parallel vocoders. The speech is replayed continuously on all the vocoders at a destination station, and using simple analog selection, the voice output is selected from one of the vocoders. Timing is maintained between the parallel vocoder paths by the insertion of blanking and erasure commands to those vocoders which have not received data packets.

The voice activated switch function of the vocoders is used to distinguish when a user is speaking. The decoder function wilt normally have priority over the encoder function. If both users at opposite ends of a link are speaking at the same time, the user at the far end will normally be given priority. So-called "comfort" noise frames and the above described blanking and erase commands are used to fill in gaps due to packets which are lost in transmission, or packets which have been delayed and are received out of sequence due to a multi-hop link. The received speech can efficiently be speeded up by removing comfort noise frames and slowed down through the insertion of blanking frames, allowing for a smooth flow of speech, despite the variable delay over the link.

In order for a network to operate efficiently using the above described techniques, it is important that transmitted data packets be tracked, to prevent the clogging of the network with old data. The use of the real time clock 148 allows each packet transmitted to be given a relative time stamp, which is decremented as the packet is passed through the network at a rate which is set relative to the real time. Packets which are not successfully received by the intended destination station within a predetermined time-out period are deleted, preventing clogging of the network.

Each station maintains a log of all the messages passing through it, to prevent messages travelling in a closed loop in the network. Once a station has passed a particular message on, it will in future, by revert back checks, prevent that message from passing through it a second time, and will simply redirect it elsewhere. Together with the above described time-out marking, this prevents messages from circling around uselessly in the network.

Figure 13:
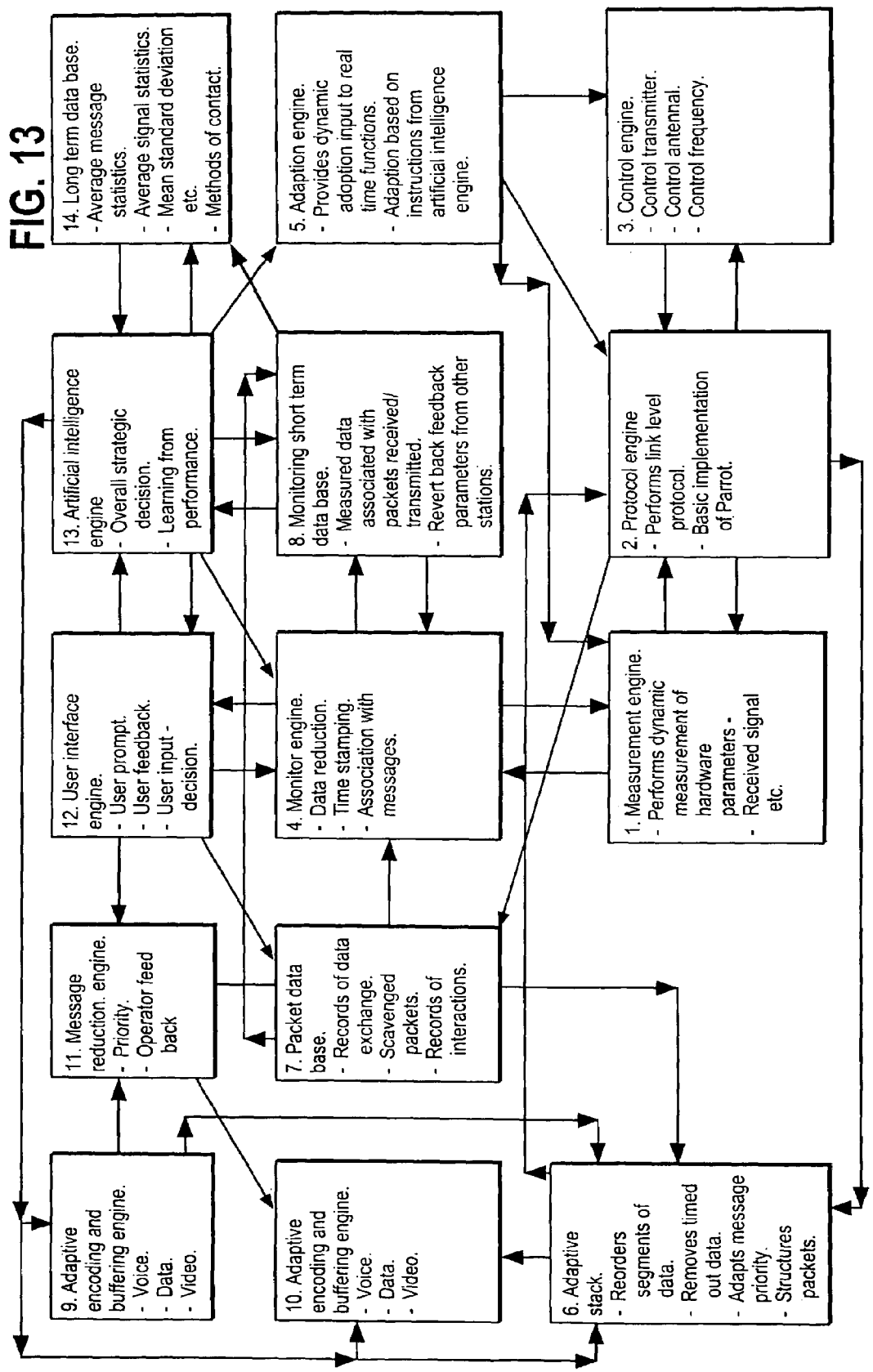
FIG. 13 is a flow chart-type diagram giving an overview of the overall software architecture of the transceiver

FIG. 13 is a schematic diagram showing the overall software architecture of the transceiver, in a flow diagram form. The diagram summarises the above described operation of a transceiver operating in a network of similar transceivers.

It will be appreciated that the embodiment of the invention described above is only one of many possible implementations of the invention, and should be construed in a non-limiting way.

What is claimed is:

1. A communication network comprising a plurality of stations (A to O) each able to transmit and receive message data, each station comprising:
    transmitter means (12, 14, 18, 20) for transmitting data to other stations; and
    receiver means (12, 14, 16, 20) for receiving data from other stations;
    and characterized in that it further comprises:
        monitoring means for monitoring at least one characteristic of respective channels between an originating station (A) and other stations corresponding to the quality of the signal path via each of said channels;
        decision means for opportunistically selecting at least one other station as an intermediate station for transmission of message data from the originating station (A) to a destination station (O), at the time of transmission of the message data, according to predetermined criteria including (1) the monitored quality of the signal path between the transmitting station and potential intermediate stations, so that the transmission takes place during peaks of opportunity, and (2) the determined probability of the receiving station's ability to relay the message data to the destination station (O), wherein no dedicated routing information is passed across the network; and
        control means for adjusting at least one parameter of a transmission signal transmitted by the transmitter means according to the monitored at least one characteristic of the respective channel to increase the probability of the transmission signal being received successfully by the selected intermediate station.

2. A communication network according to claim 1, where n the monitoring means of each station is adapted to analyze data in signals received from other stations to select the intermediate station.

3. A communication network according to claim 2, wherein the control means is adapted to monitor the age of data transmissions received from other stations in the network and to discard data transmissions older than a predetermined age.

4. A communication network according to claim 3, wherein the control means is arranged to include time data in each data transmission, to monitor the age of received data transmissions by comparing time data therein with a reference time, and to discard the received data transmissions a predetermined period after the reference time.

5. A communication network according to claim 4, wherein the control means is arranged to allocate a priority to received data transmissions and to adjust the order of retransmission of the received data transmissions to other stations according to the age thereof.

6. A communication network according to claim 2, wherein each station includes storage means for storing data in the received signals relating to the identity of the other stations, and processor means for determining the quality of the signal path between the receiving station and each of the other stations.

7. A communication network according to claim 1, where in the monitoring means is adapted to generate a probe signal for transmission to other stations, the probe signal containing at least address data identifying the originating station; and to receive an acknowledgment signal from other stations receiving the probe signal.

8. A communication network according to claim 1, wherein the control means is adapted to vary the data rate, transmission power, transmission frequency, transmission or reception antenna, message length, message priority, message time to live, time of transmission, message of retransmission rate, and/or other parameters of its transmission to the selected intermediate station.

9. Communication apparatus for use as a station in a communication network comprising a plurality of stations (A to O)) each able to transmit and receive message data, the communication apparatus comprising:
    transmitter means (12, 14, 18, 20) for transmitting data to other stations; and receiver means (12, 14, 16, 20) for receiving data from other stations;

and characterized in that it further comprises:

monitoring means for monitoring at least one characteristic of respective channels between the apparatus, operating as an originating station (A) and other stations;

decision means for opportunistically selecting at least one other station as an intermediate station for transmission of message data from the originating station (A) to a destination station (O), at the time of transmission of the message data, according to predetermined criteria including (1) the monitored quality of the signal path between the transmitting station and potential intermediate stations, so that the transmission takes place during peaks of opportunity, and (2) the determined probability of the receiving station's ability to relay the message data to the destination station (O), wherein no dedicated routing information is passed across the network; and control means for adjusting at least one parameter of a transmission signal transmitted by the transmitter means according to the monitored at least one characteristic of the respective channel to increase the probability of the transmission signal being received successfully by the selected intermediate station.

10. Communication apparatus according to claim 9, wherein the monitoring means is adapted to analyze data in signals received from other stations to select the intermediate station.

11. Communication apparatus according to claim 10, including storage means for storing data in the received signals relating to the identity of the other stations, and processor means for determining the quality of the signal path between the receiving station and each of the other stations.

12. Communication apparatus according to claim 9, wherein the monitoring means is adapted to generate a probe signal for transmission to other stations, the probe signal containing at least address data identifying the originating station; and to receive an acknowledgment signal from other stations receiving the probe signal.

13. Communication apparatus according to claim 9, wherein the monitoring means is adapted to vary the data rate, transmission power, transmission frequency, transmission or reception antenna, message length, message priority, message time to live, time of transmission, message retransmission rate, and/or other parameters of its transmission to the selected intermediate station.

14. Communication apparatus according to claim 13, wherein the monitoring means comprises power sensing means and controllable attenuator means responsive to power control signals derived from an output of the power sensing means to attenuate received and/or transmitted signals to within predetermined levels.

15. Communication apparatus according to claim 14, wherein the controllable attenuator means comprises a plurality of resistive elements and a plurality of associated solid state switch elements responsive to the power control signals and arranged to connect the resistive elements to, or disconnect them from, the signal path.

16. Communication apparatus according to claim 14, wherein the control means is adapted to adjust the transmission power of the transmission signal in response to the measured power of a received signal.

17. Communication apparatus according to claim 16, wherein the control means includes current or power sensing means for monitoring the transmission power of the transmission signal, comparison means for comparing the transmission power with the measured power of a received signal and for generating a transmission power control signal, and controllable drive means in the transmitter means responsive to the transmission power control signal to adjust the transmission power towards a value having a predetermined relationship with the measured power of the received signal.

18. Communication apparatus according to claim 13, wherein the monitoring means includes demodulator means operable at a plurality of predetermined data rates, thereby to demodulate received data at any one of the predetermined data rates.

19. Communication apparatus according to claim 18, wherein the demodulator means comprises a plurality of demodulators arranged in parallel and each operating at a respective different predetermined data rate.

20. Communication apparatus according to claim 19, wherein the demodulator means further comprises selection means for monitoring the outputs of the parallel demodulators and for selecting an output which is delivering validly demodulated data.

21. Communication apparatus according to claim 9, including processor means and associated vocoder means for converting speech to data for transmission and for converting received data to speech.

22. Communication apparatus according to claim 21, wherein the vocoder means comprises at least two vocoders arranged in parallel and operable at different data rates, the processor means being operable to select data from the vocoders for transmission according to the monitored at least one characteristic of the channel.

23. Communication apparatus according to claim 22, wherein the at least two vocoders are operable independently to convert a speech signal to respective different data signals at different data rates or using different vox settings, the processor means being operable to select any one of the different data signals for transmission.

24. Communication apparatus according to claim 22, wherein the processor means is operable to output received data to a selected one or more of the vocoders at a rate selected to convert the received data to speech according to predetermined criteria.

25. Communication apparatus according to claim 24, wherein the processor means is operable to add or remove data selectively from the received data output to the selected one or more of the vocoders to control the rate at which a speech signal represented by the received data is replayed.

26. Communication apparatus according to claim 22, wherein the at least two vocoders are operable independently, at least one to convert a speech signal to data for transmission, and at least one to simultaneously convert received data to speech.

27. Communication apparatus according to claim 9, wherein the control means is adapted to monitor the age of data transmissions received from other stations in the network and to discard data transmissions older than a predetermined age.

28. Communication apparatus according to claim 27, wherein the control means is arranged to include time data in each data transmission, to monitor the age of received data transmission by comparing time data therein with a reference time, and to discard the received data transmissions a predetermined period after the reference time.

29. Communication apparatus according to claim 28, wherein the control means is arranged to allocate a priority to received data transmissions and to adjust the order of retransmission of the received data transmissions to other stations according to the age thereof.

30. A communication network comprising a plurality of stations (A to O) each able to transmit and receive message data, each station comprising:
   transmitter means (12, 14, 18, 20) for transmitting data to other stations; and
   receiver means (12, 14, 16, 20) for receiving data from other stations;
and characterized in that it further comprises:
   monitoring means for monitoring at least one characteristic of respective channels between an originating station (A) and other stations;
   decision means for opportunistically selecting, at the time of transmission of message data, at least one other station as an intermediate station (B) for onward transmission of said message data from the originating station (A) to a destination station (O), according to the determined probability of said at least one other station's ability to relay the message data to the destination station (O), wherein no dedicated routing information is passed across the network; and
   control means for adjusting at least one parameter of a transmission signal transmitted by the transmitter means to increase the probability of the transmission signal being received successfully by the selected at least one intermediate station.

31. Communication apparatus for use as a station in a communication network comprising a plurality of stations (A to O)) each able to transmit and receive message data, the communication apparatus comprising:
   transmitter means (12, 14, 18, 20) for transmitting data to other stations; and
   receiver means (12, 14, 16, 20) for receiving data from other stations;
and characterized in that it further comprises:
   monitoring means for monitoring at least one characteristic of respective channels between the apparatus, operating as an originating station (A) and other stations;
   decision means for opportunistically selecting another station (B), at the time of transmission of message data, as an intermediate station for onward transmission of said message data from the originating station (A) to a destination station (O) according to the determined probability of said at least one other station's ability to relay the message data to the destination station (O), wherein no dedicated routing information is passed across the network; and
   control means for adjusting at least one parameter of a transmission signal transmitted by the transmitter means to increase the probability of the transmission signal being received successfully by the selected intermediate station.

* * * * *

UNITED STATES PATENT AND TRADEMARK OFFICE
CERTIFICATE OF CORRECTION

PATENT NO. : 6,965,568 B1
APPLICATION NO. : 09/570892
DATED : November 15, 2005
INVENTOR(S) : David Victor Larsen et al.

It is certified that error appears in the above-identified patent and that said Letters Patent is hereby corrected as shown below:

Title page,

Item [75] Inventor: before "Mark Sievert Larsen" insert --David Victor Larsen, James David Larsen, Gerhard Willem Van Lochem, all of Pretoria (ZA)--

Item [73] Assignee: delete "Salbu Research and Development (Proprietary) Limited" and insert --IWICS INC.--.

Signed and Sealed this

Eleventh Day of July, 2006

JON W. DUDAS
*Director of the United States Patent and Trademark Office*